United States Patent
Park et al.

(10) Patent No.: US 10,938,241 B2
(45) Date of Patent: Mar. 2, 2021

(54) WIRELESS POWER TRANSMITTING DEVICE, ELECTRONIC DEVICE FOR WIRELESSLY RECEIVING POWER AND OPERATION METHOD THEREOF

(71) Applicant: SAMSUNG ELECTRONICS CO., LTD., Suwon-si (KR)

(72) Inventors: Jae-Seok Park, Yongin-si (KR); Young-Ho Ryu, Yongin-si (KR); Chang-hyun Kim, Seoul (KR); Myung-ho Kim, Seoul (KR); Woong-Il Choi, Osan-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 22 days.

(21) Appl. No.: 15/950,828

(22) Filed: Apr. 11, 2018

(65) Prior Publication Data
US 2018/0301937 A1    Oct. 18, 2018

Related U.S. Application Data

(60) Provisional application No. 62/484,473, filed on Apr. 12, 2017.

(30) Foreign Application Priority Data

Nov. 22, 2017    (KR) ........................ 10-2017-0156739

(51) Int. Cl.
*H02J 50/12*    (2016.01)
*H04N 21/472*    (2011.01)
(Continued)

(52) U.S. Cl.
CPC .............. *H02J 50/12* (2016.02); *H02J 50/60* (2016.02); *H04N 21/47217* (2013.01); *H04N 21/4436* (2013.01)

(58) Field of Classification Search
CPC .. H02J 50/12; H02J 50/10; H02J 50/60; H02J 50/80; H02J 7/025; H02J 5/005; H04N 21/47217; H01F 38/14
(Continued)

(56) References Cited

U.S. PATENT DOCUMENTS 10,158,259 B1 *  12/2018  Leabman ............. H04B 5/0037
2009/0284245 A1   11/2009  Kirby et al.
(Continued)

FOREIGN PATENT DOCUMENTS

JP    2010-119246 A    5/2010
JP    2010210412 A     9/2010
(Continued)

OTHER PUBLICATIONS

International Search Report (PCT/ISA/210) dated Jul. 13, 2018 issued by the International Searching Authority in International Application No. PCT/KR2018/004091.
(Continued)

*Primary Examiner* — Rexford N Barnie
*Assistant Examiner* — Jagdeep S Dhillon
(74) *Attorney, Agent, or Firm* — Sughrue Mion, PLLC

(57) ABSTRACT

A wireless power transmitting device according to an embodiment may include a power transmission circuit and a processor. The processor may be configured to control the power transmission circuit to wirelessly transmit power to a first area around the wireless power transmitting device, perform a predetermined first operation when an obstacle is detected in a second area around the first area, and perform a predetermined second operation when it is detected that the obstacle has entered the first area.

26 Claims, 26 Drawing Sheets

(51) Int. Cl.
*H02J 50/60* (2016.01)
*H04N 21/443* (2011.01)

(58) Field of Classification Search
USPC .......................................................... 307/104
See application file for complete search history.

(56) References Cited

U.S. PATENT DOCUMENTS

| | | | |
|---|---|---|---|
| 2011/0221388 A1 | 9/2011 | Low et al. | |
| 2011/0270462 A1 | 11/2011 | Amano et al. | |
| 2013/0062959 A1 | 3/2013 | Lee et al. | |
| 2014/0316261 A1 | 10/2014 | Lux et al. | |
| 2015/0323694 A1* | 11/2015 | Roy | H02J 50/12 307/104 |
| 2015/0349541 A1* | 12/2015 | Yamamoto | G01V 3/10 307/104 |
| 2016/0187520 A1* | 6/2016 | Widmer | G01V 3/10 324/227 |
| 2016/0197522 A1 | 7/2016 | Zeine et al. | |
| 2016/0247403 A1 | 8/2016 | Krauss et al. | |
| 2016/0352155 A1* | 12/2016 | Iwasaki | H02J 50/60 |
| 2017/0033615 A1* | 2/2017 | Asanuma | H02J 5/005 |
| 2017/0077736 A1 | 3/2017 | Leabman | |
| 2017/0085126 A1* | 3/2017 | Leabman | H02J 17/00 |
| 2017/0093229 A1 | 3/2017 | Sindia et al. | |
| 2018/0166929 A1* | 6/2018 | Sawai | B60L 53/12 |
| 2018/0198199 A1* | 7/2018 | Hosseini | H01Q 1/521 |
| 2018/0241255 A1* | 8/2018 | Leabman | H02J 50/40 |
| 2018/0262049 A1* | 9/2018 | Ikefuji | H02J 50/05 |
| 2019/0131827 A1* | 5/2019 | Johnston | H02J 50/80 |

FOREIGN PATENT DOCUMENTS

| | | |
|---|---|---|
| KR | 1020120077448 A | 7/2012 |
| KR | 10-2014-0067098 A | 6/2014 |
| KR | 10-2017-0033257 A | 3/2017 |

OTHER PUBLICATIONS

Written Opinion (PCT/ISA/237) dated Jul. 13, 2018 issued by the International Searching Authority in International Application No. PCT/KR2018/004091.

* cited by examiner

WIRELESS POWER TRANSMITTING DEVICE, ELECTRONIC DEVICE FOR WIRELESSLY RECEIVING POWER AND OPERATION METHOD THEREOF

CROSS-REFERENCE TO RELATED APPLICATIONS

This application is based on and claims priority under 35 U.S.C. § 119 to U.S. Provisional Patent Application No. 62/484,473, filed on Apr. 12, 2017 in the United States Patent and Trademark Office and Korean Patent Application No. 10-2017-0156739, filed on Nov. 22, 2017 in the Korean Intellectual Property Office, the disclosures of which are incorporated by reference herein in their entireties.

BACKGROUND

1. Field

The disclosure relates to a wireless power transmitting device that wirelessly transmits power, an electronic device for wirelessly receiving power, and an operation method thereof.

2. Description of Related Art

Digital mobile communication devices have become a necessity for most people who live in the contemporary society. Customers want to be provided with various high-quality services anywhere at any time. In addition, recently, various sensors, appliances, communication devices etc. that are used in daily life are being integrated into a network with the advent of Internet of things (IoT) technology. A wireless power transmission system makes it possible to operate these various sensors more effectively.

Magnetic induction, magnetic resonance, and electromagnetic wave schemes are representative of methods of wireless power transmission. The magnetic induction or magnetic resonance method is advantageous in charging electronic devices relatively close to a wireless power transmitting device. The electromagnetic wave scheme is more advantageous in transmitting power to a distance about several meters, as compared with the magnetic induction or magnetic resonance method. The electromagnetic wave scheme is mainly used for remote power transmission and through this method, the transmitter can locate the exact location of a power receiver at a relatively long distance and transmit power more efficiently.

SUMMARY

One or more example embodiments provide a device and a method for transmitting and receiving power with relatively high efficiency even when the distance between a wireless power transmitting device and an electronic device is relatively long. When there is a human body between a wireless power transmitting device and an electronic device, there is a possibility that the human body may be exposed to a harmful magnetic field or electric field. When a wireless power transmitting device additionally transmits communication signals such as media data other than power, the performance of the transmission of the media data may be negatively affected by an obstacle.

In accordance with an aspect of the disclosure, a wireless power transmitting device, an electronic device, and an operation method thereof may be provided to estimate whether there is an obstacle between a wireless power transmitting device and an electronic device and may perform an operation corresponding to the estimated result.

In accordance with an aspect of the disclosure, a wireless power transmitting device may include: a power transmission circuit and a processor. The processor may be configured to control the power transmission circuit to wirelessly transmit power to a first area around the wireless power transmitting device, perform a predetermined first operation when an obstacle is detected in a second area around the first section, and perform a predetermined second operation when it is detected that the obstacle has entered the first area.

In accordance with an aspect of the disclosure, a method of operating a wireless power transmitting device may include: wirelessly transmitting power to a first area around the wireless power transmitting device; performing a predetermined first operation in response to an obstacle being detected in a second area around the first area; and performing a predetermined second operation in response to detecting the obstacle entering the first area.

In accordance with an aspect of the disclosure, a wireless power transmitting device, an electronic device, and an operation method thereof may be provided where it may be estimated whether there is an obstacle between a wireless power transmitting device and an electronic device and an operation corresponding to the estimated result may be performed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
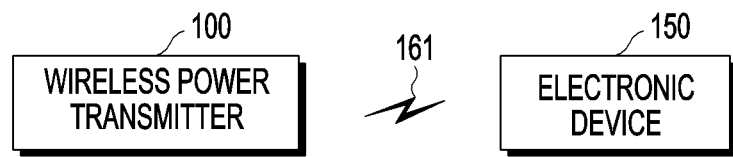
FIG. 1A is a block diagram of a wireless power transmitting device and an electronic device according to an embodiment.

Reference will now be made in detail to example embodiments, with reference to the accompanying drawings. The example embodiments and the terms used therein are not intended to limit the technology disclosed herein to specific forms, and should be understood to include various modifications, equivalents, and/or alternatives to the corresponding example embodiments. In describing the drawings, identical or similar reference numerals may be used to designate similar constituent elements. A singular expression may include a plural expression, and vice versa, unless they are definitely different in a context. As used herein, singular forms may include plural forms as well unless the context clearly indicates otherwise. The expression "first," "a second," "the first," or "the second" used in various embodiments may use various components regardless of the order and/or the importance without limiting the components. When an element (e.g., first element) is referred to as being "(functionally or communicatively) connected," or "coupled" to another element (second element), the element may be connected directly to the another element or connected to the another element through yet another element (e.g., third element).

The expression "configured to" as used in various embodiments may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

A wireless power transmission device or an electronic device according to an embodiment may include at least one of, for example, a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to an embodiment, the wearable device may include at least one of an accessory type (e.g., a watch, a ring, a bracelet, an anklet, a necklace, a glasses, a contact lens, or a head-mounted display (HMD) device), a fabric or clothing integrated type (e.g., an electronic clothing), a body-mounted type (e.g., a skin pad or tattoo), and a bio-implantable type (e.g., an implantable circuit). In an embodiment, the wireless power transmission device or the electronic device may include at least one of, for example, a television, a set-top box linked wiredly or wirelessly to a television, a digital versatile disc (DVD) player, an audio, a refrigerator, an air conditioner, a vacuum cleaner, an oven, a microwave oven, a washing machine, an air cleaner, a set-top box, a home automation control panel, a smart thermostat, a security control panel, a media box, a video game console, an electronic dictionary, an electronic key, a camcorder, an electric vehicle, and an electronic photo frame.

In an embodiment, the wireless power transmission device or the electronic device may include at least one of various medical devices (e.g., various portable medical measuring devices (a blood glucose monitor, a heart rate monitor, a blood pressure monitor, a body temperature monitor, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, a gyro-compass, etc.), avionics, security devices, an automotive head unit, a robot for home or industry, an automated teller machine (ATM) in banks, a point-of-sale (POS) device, or an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.). According to an embodiment, the wireless power transmission device or the electronic device may include at least one of a part of furniture or a building/structure, an electronic board, an electronic signature receiving device, a projector, and various types of measuring instruments (e.g., a water meter, an electric meter, a gas meter, a radio wave meter, and the like). In an embodiment, the wireless power transmission device or the electronic device may be flexible, or may be a combination of one or more of the aforementioned various devices. The wireless power transmission device or the electronic device according to an embodiment is not limited to the above described devices. In the present disclosure, the term "user" may indicate a person using an electronic device or a device (e.g., an artificial intelligence electronic device) using a wireless power transmission device or an electronic device.

FIG. 1A is a block diagram of a wireless power transmitting device and an electronic device according to an embodiment.

Referring to FIG. 1A, a wireless power transmitting device 100 according to an embodiment can wirelessly transmit power 161 to at least one electronic device 150. The wireless power transmitting device 100 can transmit power 161 to the electronic device 150 in accordance with various charging methods. For example, the wireless power transmitting device 100 can transmit power 161 in accordance with an induction scheme. When the wireless power transmitting device 100 is based on the induction scheme, the wireless power transmitting device 100 may include, for example, a power source, an alternating current to direct current (AC-DC) circuit, an amplifying circuit, an impedance matching circuit, at least one capacitor, at least one coil, a communication modulation/demodulation circuit. At least one capacitor may constitute a resonance circuit in combination with at least one coil. The wireless power transmitting device 100 can be implemented by the method defined by Wireless Power Consortium (WPC) standard (or, Qi standard). For example, the wireless power transmitting device 100 can transmit power 161 in accordance with a resonance method. When the wireless power transmitting device 100 is based on the resonance method, the wireless power transmitting device 100, for example, may include a power source, an AC-DC circuit, an amplifying circuit, an impedance matching circuit, at least one capacitor, at least one coil, and an out-band communication circuit (e.g., a Bluetooth Low Energy (BLE) communication circuit). At least one capacitor and at least one coil may constitute a resonance circuit. The wireless power transmitting device 100 can be implemented by the method defined by Alliance for Wireless Power (A4WP) standard (or Air Fuel Alliance (AFA) standard). The wireless power transmitting device 100 may include a coil that can generate an induced magnetic field when a current flows in accordance with the resonance method or the induction scheme. The process in which the wireless power transmitting device 100 generates an induced magnetic field may be expressed as that the wireless power transmitting device 100 wirelessly transmits power 161. The electronic device 150 may include a coil that generates an induced electromotive force, using a magnetic field that is generated around the coil and of which the magnitude changes in accordance with time. A process in which the electronic device 150 generates an induced electromotive force through the coil may be expressed as that the electronic device 150 wirelessly receives power 161. For example, the wireless power transmitting device 100 can transmit power 161 in accordance with an electromagnetic wave scheme. When the wireless power transmitting device 100 is based on the electromagnetic wave scheme, the wireless power transmitting device 100, for example, may include a power source, an AC-DC circuit, an amplifying circuit, a distribution circuit, a phase shifter, a power reception antenna array including a plurality of patch antennas, and an out-band type communication circuit (for example, a BLE communication module). The patch antennas each can generate a radio frequency (RF) wave. The electronic device 150 may include a patch antenna that can output a current, using an RF wave generated around it. The process in which the wireless power transmitting device 100 generates an RF wave may be expressed as that the wireless power transmitting device 100 wirelessly transmits power 161. A process by which the electronic device 150 outputs a current from a patch antenna, using an RF wave, may be referred to as the electronic device 150 wirelessly receiving power 161.

The wireless power transmitting device 100 according to an embodiment may communicate with the electronic device 150. For example, the wireless power transmitting device 100 may communicate with the electronic device 150 in accordance with an in-band scheme. The wireless power transmitting device 100 or the electronic device 150 may change a load (or impedance) for data to transmit, for example, in accordance with an on/off keying modulation method. The wireless power transmitting device 100 or the electronic device 150 can determine data that is transmitted from the counter device by measuring a load change (or an impedance change) based on a change in the intensity (e.g., amount, level, etc.) of current, voltage, or power of a coil. For example, the wireless power transmitting device 100 can communicate with the electronic device 150 in accordance with an out-band scheme. The wireless power transmitting device 100 or the electronic device 150 can transmit/receive data, using a communication circuit (for example, a BLE communication module) provided separately from a coil or a patch antenna. The wireless power transmitting device 100 can also transmit media data, and a plurality of different communication circuits (e.g., a BLE communication module, a Wi-Fi module, and a Wireless Gigabit Alliance (Wi-Gig) module) may transmit/receive data (e.g., media data) and wireless power transmission/reception control signals.

Figure 1B:
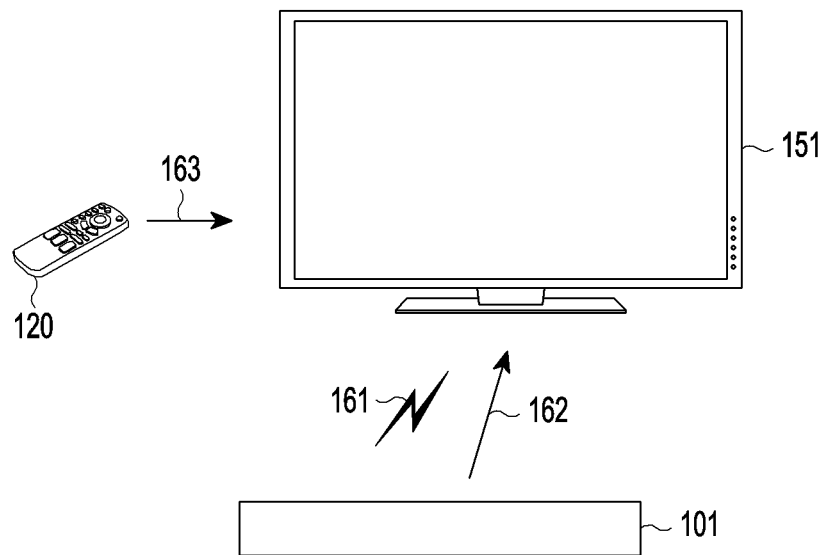
FIG. 1B is a conceptual diagram of a set-top box and a TV according to an embodiment.

FIG. 1B is a conceptual diagram of a set-top box and a TV according to an embodiment.

A set-top box 101 according to an embodiment may wirelessly transmit power 161 to a TV 151. The set-top box 101 may be an example of the wireless power transmitting device 100 and the TV 151 may be an example of the electronic device 150 that wirelessly receives power. The set-top box 101 may include a power transmission circuit based on at least one of the various wireless charging methods described above. It is just an example that the set-top box 101 wirelessly transmits power, and various electronic devices other than the set-top box 101, for example, an electronic device that can transmit/receive data to/from the TV 151 such as a speaker may also be implemented to be able to wirelessly transmit power to the TV 151. The set-top box 101 may transmit a communication signal 162 to the TV 151. For example, the communication signal 162 may include data for content (e.g., audio, video, etc.) that is displayed on the TV 151, data for controlling wireless charging, and TV control data for controlling the operation of the TV 151. The media data, data for controlling wireless charting, and the TV control data may be transmitted/received by the same communication scheme or different communication schemes. For example, the set-top box 101 can transmit media data to the TV 151 in accordance with a Wi-Fi communication scheme using a Wi-Fi module, transmit/receive the data for controlling wireless charting using a BLE module, and transmit the TV control data to the TV 151 using an infrared (IR) module. For example, the TV 151 may include an IR module for receiving the control signal 163 according to an IR communication scheme from a controller 120 such as a remote controller and can receive the communication signal 162 including the TV control data from the set-top box 101. The control signal 163 may be a signal including an operation command. The control signal 163 may be transmitted from the controller 120, and the control signal 163 may also be referred to as an operation command. In an embodiment, at least two of the media data, data for controlling wireless charging, and TV control data can be transmitted/received by one communication module. For example, the set-top box 101 may transmit media data to the TV 151 through a Wi-Fi module and transmit data for controlling wireless charging and TV control data through the BLE module.

In an embodiment, the set-top box 101 may change the intensity (e.g., amount) of power that is wirelessly transmitted in real time in consideration of the amount of power required by the TV 151. For example, the TV 151 may periodically or aperiodically report the amount of power corresponding to the current state to the set-top box 101. The set-top box 101 may adjust the intensity of the power that is transmitted to the TV 151 based on the reporting result. For example, when the brightness of the TV 151 changes from a first brightness level to a second brightness level, the TV 151 may identify the required amount of additional power needed for the change of brightness and may report information about the additional required amount of power to the set-top box 101. The set-top box 101 may adjust the intensity of power to transmit based on the received information about the required amount of power. Accordingly, even if the amount of power required by the TV 151 changes, the TV 151 can receive sufficient intensity of power in a consistent manner. Further, the intensity of power that is transmitted from the set-top box 101 to the TV 151 may be determined based on the current state of the TV 151, so waste of power can be reduced or prevented. In another example, the set-top box 101 may check the current state of the TV 151 and calculate the amount of power required by the TV 151 based on a control signal received from a remote controller etc. For example, the set-top box 101 may recognize that the TV 151 is currently in a brightness adjustment state and receive a control signal for increasing the brightness from a remote controller etc. The set-top box 101 may calculate the amount of power that would be required by the TV 151 once the control signal is applied, and adjust the intensity of power that is wirelessly transmitted based on the calculated result.

Figure 2:
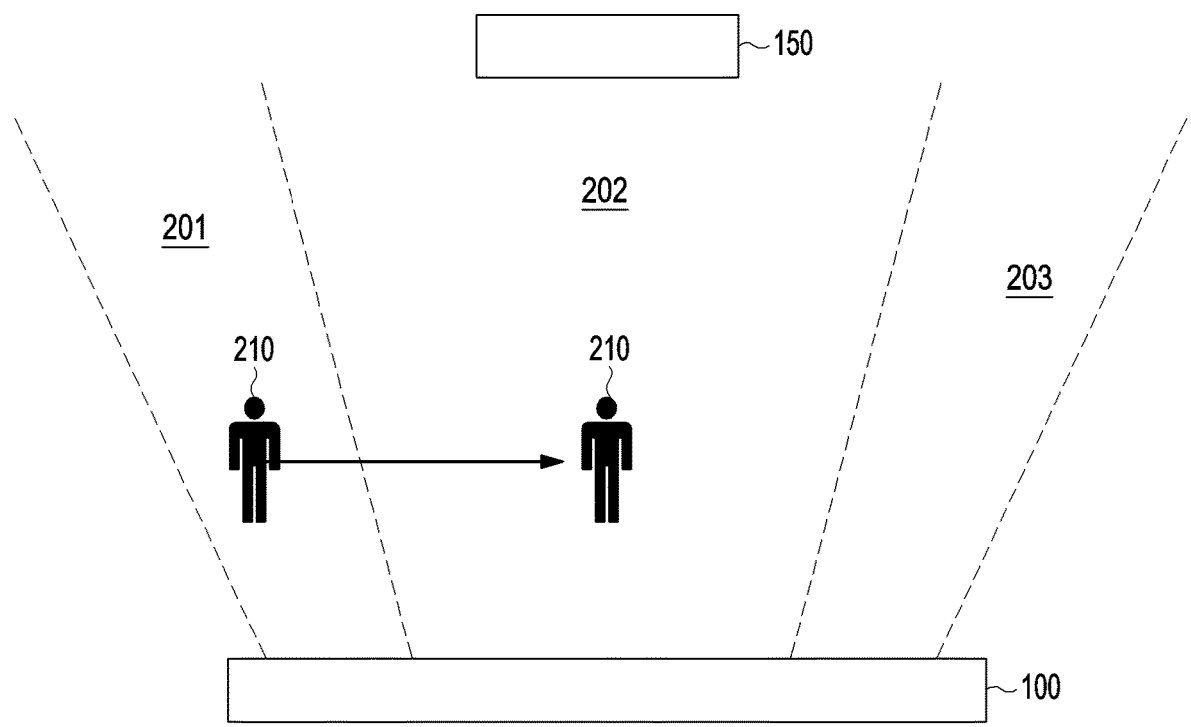
FIG. 2 is a conceptual diagram illustrating a process where an object enters between a wireless power transmitting device and an electronic device according to an embodiment.

FIG. 2 is a conceptual diagram illustrating a process in which an object enters between a wireless power transmitting device and an electronic device according to an embodiment.

The wireless power transmitting device 100 according to an embodiment may wirelessly transmit power for a charging section 202. The charging section 202 may be determined by the arranged position or the arranged direction of a power transmission circuit included in the wireless power transmitting device 100. The charging section 202 may mean a section or area where the magnitude of a magnetic field or an electric filed transmitted from the wireless power transmitting device 100 is measured at a threshold value or more. For example, the threshold value for determining the charging section 202 may be the magnitude of a magnetic field or an electric field that has been proved not to be harmful even if it is applied to a human body. The wireless power transmitting device 100 may form a magnetic field or an electric field having a magnitude of a threshold value or more in the charging section 202 by applying a current to a coil. Alternatively, the wireless power transmitting device 100 may form an RF wave having a magnitude of a threshold value or more for at least one location in the charging section 202 by performing beam-forming on the location of the charging section 202, using an array of a plurality of patch antennas. Accordingly, the dividing lines between the charging section 202 and surrounding sections 201 and 203 may be changed in accordance with the intensity of the power that is transmitted by the wireless power transmitting device 100. When the wireless power transmitting device 100 transmits power having relatively high intensity, the area of the charging section 202 may be relatively large in size, and when the wireless power transmitting device 100 transmits power having relatively low intensity, the area of the charging section 202 may be relatively small in size.

In the present disclosure, wireless transmission of power may mean forming an induced magnetic field by applying a current to a coil or forming an RF wave using a patch antenna array. Further, in the present disclosure, wireless reception of power may mean that a coil generates an induced electromotive force from a magnetic field generated around it or converts an RF wave into a current using at least one patch antenna. The wireless power transmitting device 100 may monitor whether an obstacle appear in surrounding areas such as the surrounding sections 201 and 203 at the left and right sides of the charging section 202. When an obstacle 210 moves into the charging section 202 from the surrounding section 201, a magnetic field or an electric field having a magnitude of a threshold value or more can be applied to the obstacle 210. The obstacle 210 may be an object, a person, an animal, or any animate/inanimate object that is capable of affecting or interfering with the electromagnetic field in the charging section. The wireless power transmitting device 100 may monitor the surrounding section 210 and 203, and when it is determined that the obstacle 210 has entered the charging section 202, the wireless power transmitting device 100 may perform an operation prepared for entry of the obstacle 210 into the charging section 202. For example, the wireless power transmitting device 100 may reduce the intensity of power to transmit by a predetermined level in advance, prepare for changing the charging path, or output a warning signal through various output devices. The wireless power transmitting device 100 may monitor the obstacle 210 entering the charging section 202 from the surrounding section 201. The wireless power transmitting device 100 may perform an operation corresponding to entry into the charging section of the obstacle 210. When it is detected that the obstacle 210 has entered the charging section 202, the wireless power transmitting device 100 may additionally reduce the intensity of the power that is transmitted, change the charging path, or output an additional warning signal.

The wireless power transmitting device 100 may detect the obstacle 210 moving out of the surrounding sections 201 and 203 from the charging section 202. The wireless power transmitting device 100 may perform an operation corresponding to movement out of the charging section 202 of the obstacle 210. When it is detected that the obstacle 210 has moved out of the charging section 202, the wireless power transmitting device 100 may increase the intensity of the power that is transmitted or change again the charging path. In this specification, when the wireless power transmitting device 100 or the electric device 150 performs a specific operation, it may mean that various pieces of hardware included in the wireless power transmitting device 100 or the electronic device 150, for example, a control circuit, a coil, or a patch antenna performs the specific operation.

Alternatively, when the wireless power transmitting device 100 or the electric device 150 performs a specific operation, it may mean that they control another piece of hardware to perform the specific operation. Alternatively, when the wireless power transmitting device 100 or the electric device 150 performs a specific operation, it may mean that an instruction stored to perform the specific operation in a storage circuit (e.g., a memory) of the wireless power transmitting device 100 or the electronic device 150 makes a processor or another piece of hardware perform the specific operation.

For example, when the obstacle 210 moves from the surrounding section 201 to the charging section 202, the wireless power transmitting device 100 may gradually reduce the intensity of the power that is transmitted, in accordance with the path of the obstacle 210. Alternatively, when the obstacle 210 reaches the boundary between the charging section 202 and the surrounding section 201, the wireless power transmitting device 100 may reduce at one time the intensity of the power that is transmitted. The wireless power transmitting device 100 may measure the time that has passed after the obstacle 210 enters the surrounding section 201 or the charging section 202, and may perform a predetermined operation when the measured time exceeds a threshold value.

Figure 3:
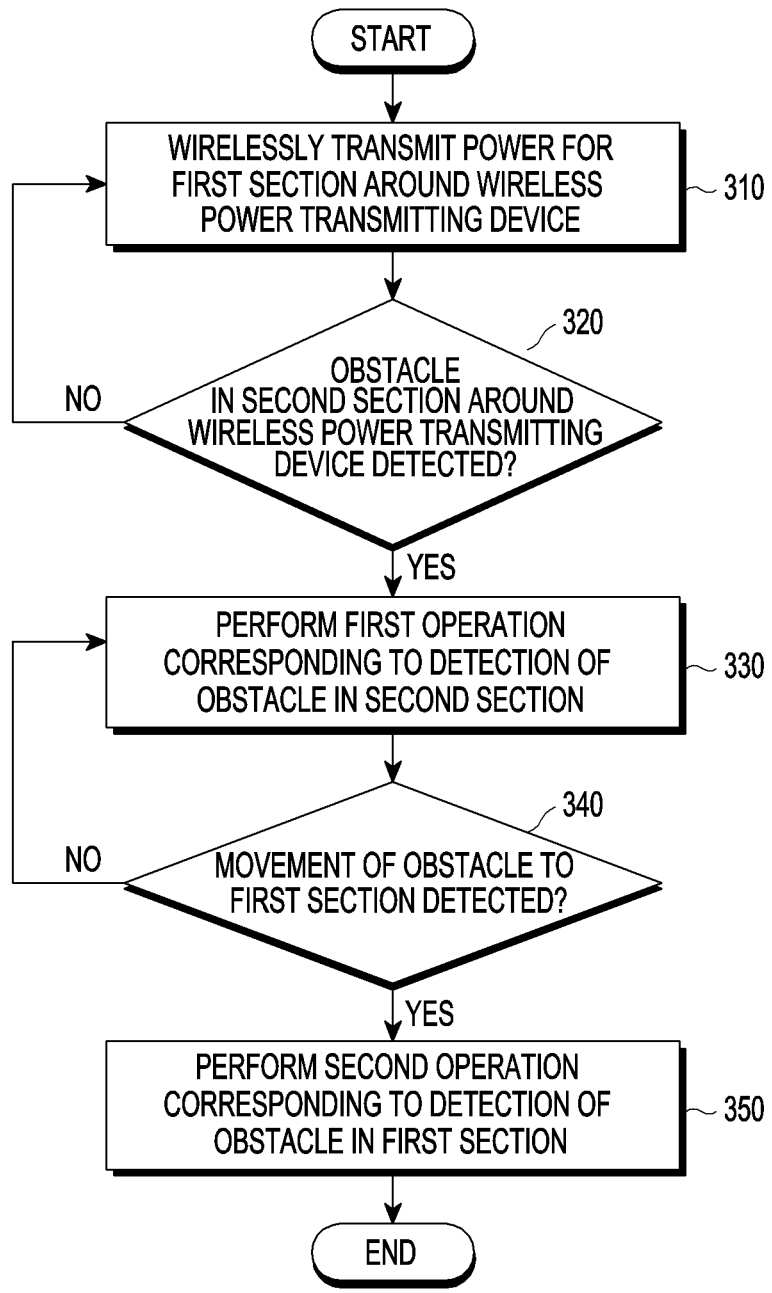
FIG. 3 is a flowchart illustrating a method of operating a wireless power transmitting device according to an embodiment.

FIG. 3 is a flowchart illustrating a method of operating a wireless power transmitting device according to an embodiment.

In operation 310, the wireless power transmitting device 100 may wirelessly transmit power for a first section (also referred to as "first area") around the wireless power transmitting device 100. The first section, for example, may be the charging section 202 in FIG. 2. The wireless power transmitting device 100 may adjust the transmission direction of power by adjusting one of the phases and amplitudes of an electrical signals input to an array of patch antennas, and for example, the wireless power transmitting device 100 may form an RF wave by performing beam-forming on at least one location in the first section. Alternatively, the wireless power transmitting device 100 may not adjust the transmission direction of power, and when the wireless power transmitting device 100 applies a current to a coil, a magnetic field or an electric field may be formed in the first section. The electronic device 150 may wirelessly receive the power transmitted from the wireless power transmitting device 100. The wireless power transmitting device 100 may detect the electronic device 150 on the basis definitions under various standards, and perform preprocesses prescribed in advance for charging and transmit power.

In operation 320, the wireless power transmitting device 100 may determine whether an obstacle has been detected in a second section (also referred to as "second area") around the wireless power transmitting device 100. The second section, for example, may be the surrounding sections 201 and 203 in FIG. 2. The magnitude of a magnetic field or an electric filed transmitted from the wireless power transmitting device 100 may be measured below the threshold value in part or all of the surrounding sections 201 and 203. The wireless power transmitting device 100 may detect whether an obstacle has shown, using various sensors. When an obstacle is detected in the second section, the wireless power transmitting device 100 may perform a first operation corresponding to detection of an obstacle in the second section in operation 330. For example, the wireless power transmitting device 100 may reduce the intensity of the power that is transmitted by a predetermined level, determine the transmission path of power to correspond to the location of the obstacle, or output a warning signal. In operation 340, the wireless power transmitting device 100 may determine that movement of the obstacle to the first section has been detected. When it is detected that an obstacle moves to the first section, the wireless power transmitting device 100 can perform a second operation corresponding to detection of an obstacle in the first section in operation 350. For example, the wireless power transmitting device 100 may reduce the intensity of the power that is transmitted, change the transmission path of power, or output a warning signal. As the intensity of the power that is transmitted is reduced, the intensity of power that is applied to the obstacle 210 may be decreased, so it is possible to secure safety of a human or an animal. Alternatively, the transmission path of the power may be changed so as to not influence the obstacle 210, and/or to ensure safety of a human and an animal. The wireless power transmitting device 100 may further increase safety of a living body by estimating that the living body will enter the first section to which relatively high intensity of power is applied, and then performing a corresponding operation, before the living body enters the first section.

Figure 4A:
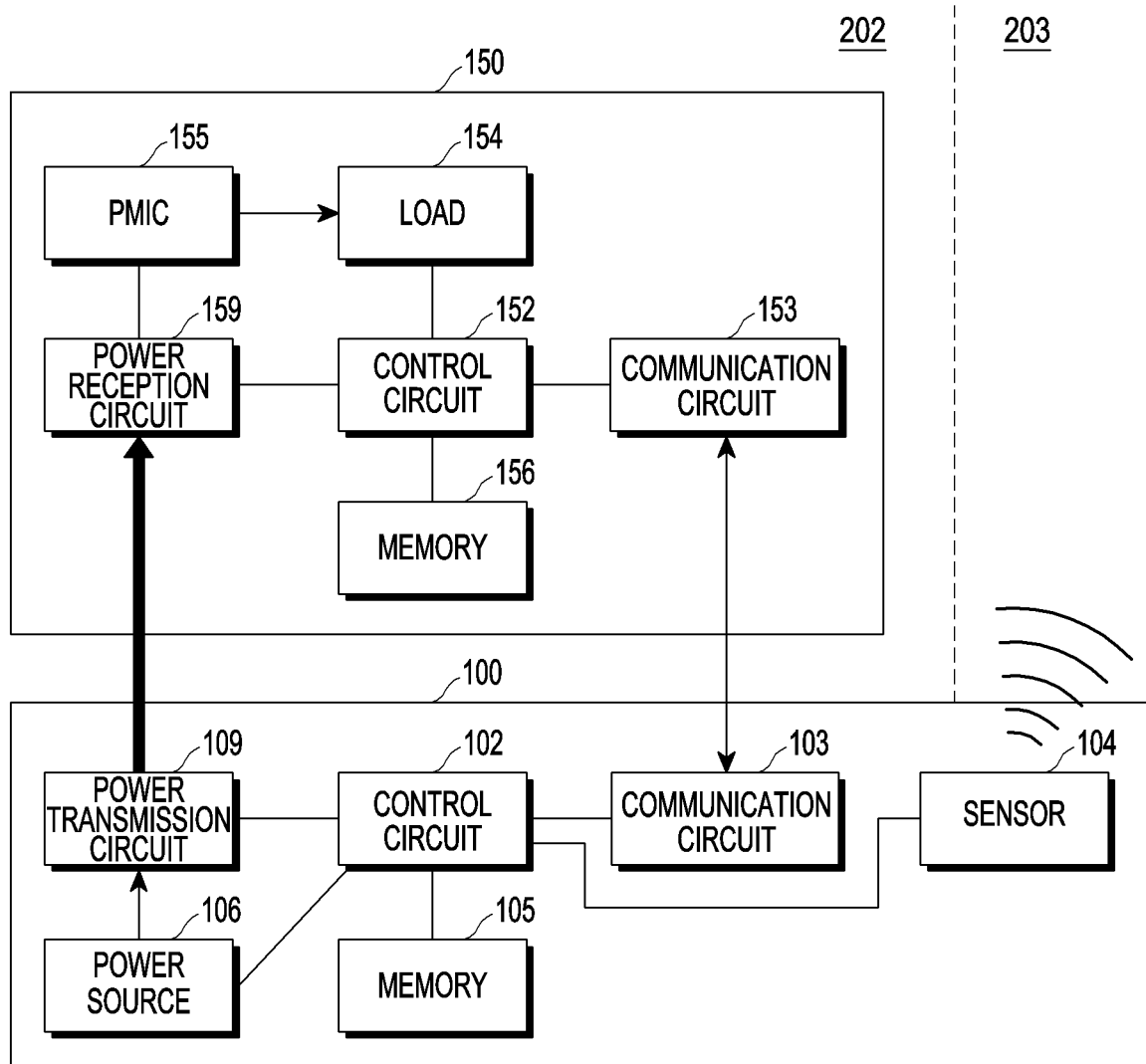
FIG. 4A is a block diagram of a wireless power transmitting device and an electronic device according to an embodiment.

FIG. 4A is a block diagram of a wireless power transmitting device and an electronic device according to an embodiment.

The wireless power transmitting device 100 according to an embodiment may include a power transmission circuit 109, a control circuit 102, a communication circuit 103, a sensor 104, a memory 105, and a power source 106. The electronic device 150 according to an embodiment may include a power reception circuit 159, a control circuit 152, a communication circuit 153, a load 154, a power management integrated circuit (PMIC) 155, and a memory 156.

The power transmission circuit 109 according to an embodiment may wirelessly transmit power to the power reception circuit 159 in accordance with at least one of an induction scheme, a resonance method, and an electromagnetic wave scheme. The detailed configuration of the power transmission circuit 109 and the power reception circuit 159 will be described in more detail with reference to FIGS. 4D and 4E. The control circuit 102 may control the intensity of the power that is transmitted by the power transmission circuit 109. For example, the control circuit 102 may control the intensity of the power that is transmitted by the power transmission circuit 109 by controlling the intensity of power that is output from the power source 106 or by controlling the amplification gain of a power amplifier included in the power transmission circuit 109. The control circuit 102 may adjust the intensity of power that is output from the power source 106 by controlling the duty cycle or frequency of power that is output from the power source 106. The control circuit 102 may control the intensity of power that is applied to the power transmission circuit 109 by controlling the intensity of bias voltage of the power amplifier. The control circuit 102 or the control circuit 152 may be implemented as various circuits that can perform calculation such as a general-purpose processor such as a CPU, a mini computer, a microprocessor, a microcontroller unit (MCU), a field-programmable gate array (FPGA), etc. The control circuit 102, for example, may control at least one of the power source 106 and the power transmission circuit 109 to transmit power having a predetermined intensity.

The power reception circuit 159 according to an embodiment may wirelessly receive power from the power transmission circuit 109 in accordance with at least one of an induction scheme, a resonance method, and an electromagnetic wave scheme. The power reception circuit 159 may perform power processing that rectifies the received power from an AC waveform into a DC waveform, convert voltage, or regulate power. The PMIC 155 may process the received and processed power to be suitable for hardware (e.g., the load 154) and then transmit the power to each hardware. The load 154, for example, may include a display that displays media data received from the wireless power transmitting device 100, and may include various pieces of hardware that consume power. The control circuit 152 may control the entire operation of the electronic device 150. Instructions for performing the entire operation of the electronic device 150 may be stored in the memory 156. The communication circuit 103, for example, may transmit media data signals or information about wireless power transmission/reception to the communication circuit 153. The memory 105 may store the instructions for performing the operation of the wireless power transmitting device 100. The memory 105 or the memory 156 may be implemented in various types such as a read-only memory (ROM), a random access memory (RAM), a flash memory, etc. The sensor 104 may sense data about the surrounding section 203 and the control circuit 102 may determine whether an obstacle has appeared in the surrounding section 203, using the sensed data. The sensor 104 may also sense data bout the other surrounding section 201 and the charging section 202. Alternatively, one or more additional sensors may sense data about at least one of the other surrounding section 201 or the charging section 202. The sensor 104 may be any type of sensor that is capable of sensing data for detecting the presence of an obstacle, and it may be implemented in various types such as a communication circuit, a camera, a proximity sensor, and an ultrasonic sensor. The control circuit 102 may detect an obstacle showing in the surrounding section 203, using the sensed data, and perform an operation corresponding to appearance of an obstacle in the surrounding section 203. The sensor 104 or other sensors may sense data about an obstacle entering the charging section 202. The control circuit 102 may detect an obstacle based on the data about entry of an obstacle into the charging section 202 and perform a corresponding operation. The control circuit 102 may detect an obstacle exiting the charging section 202 based on data from the sensor 104 or other sensors and perform a corresponding operation. The control circuit 102 may detect an obstacle exiting the surrounding section 203 based on data from the sensor 104 or other sensors and perform a corresponding operation. In an embodiment, the control circuit 102 may reduce the intensity of the power that is transmitted, for example, by controlling at least one of the power source 106 and the power transmission circuit 109 in order to perform various operations. Alternatively, the control circuit 102, for example, may adjust the transmission path through which the power is transmitted, by controlling the power transmission circuit 109. Alternatively, the control circuit 102 may output a warning message through an output device (e.g., a mobile device, a television, a display, a speaker, etc.). The control circuit 102 may transmit a warning message to the communication circuit 103 of the electronic device 150 through the communication circuit, and in this case, the electronic device 150 may output a warning message through the output device.

Figure 4B:
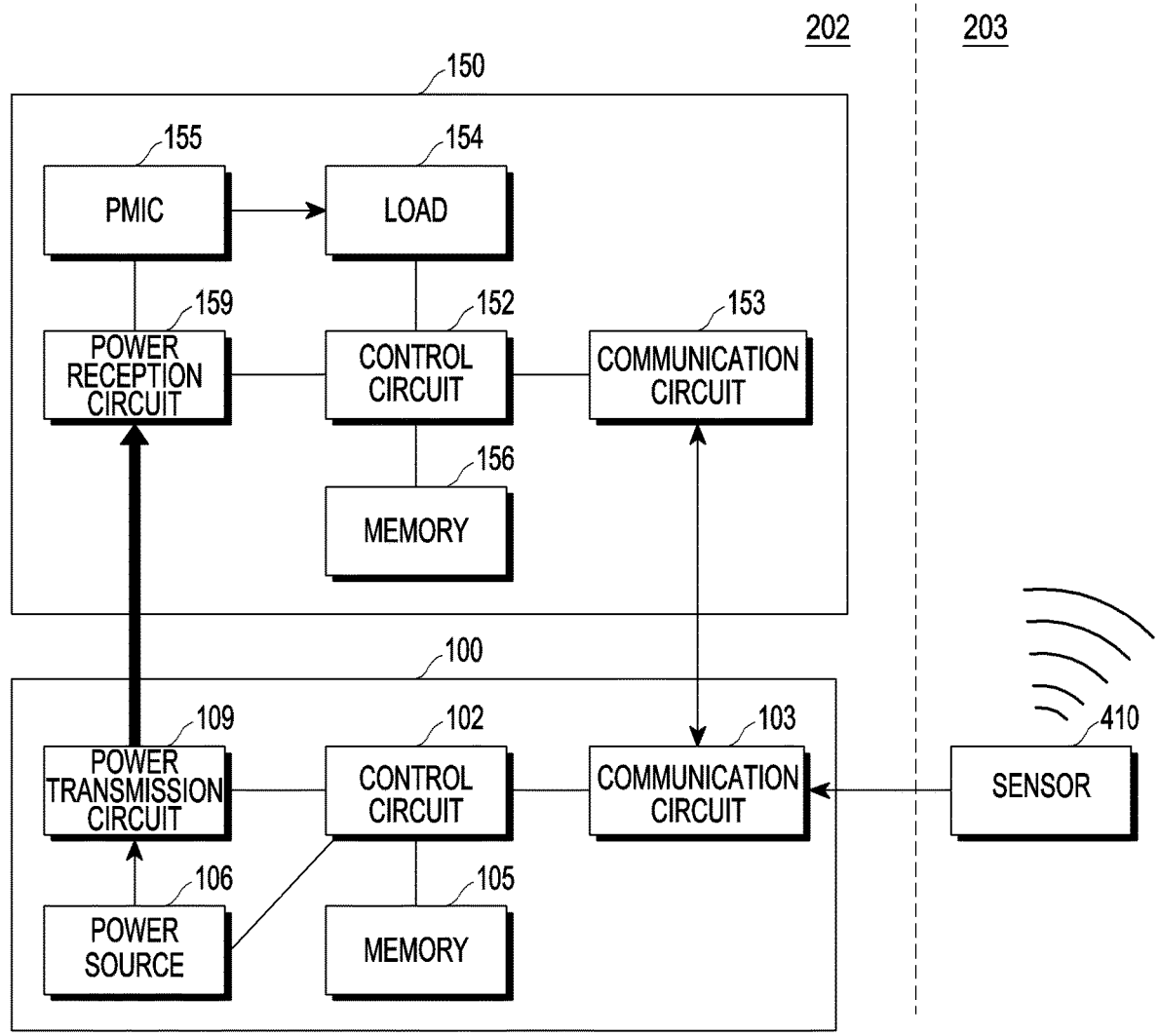
FIG. 4B is a block diagram of a wireless power transmitting device, an electronic device, and a sensor according to an embodiment.

FIG. 4B is a block diagram of a wireless power transmitting device, an electronic device, and a sensor according to an embodiment.

The wireless power transmitting device 100 shown in FIG. 4B may not include the sensor 104, as compared with the wireless power transmitting device 100 shown in FIG. 4A. An external sensor 410 may be similar to the sensor 104. The external sensor 410 may sense data related to the surrounding section 203 and transmit the sensed data to the communication circuit 103 of the wireless power transmitting device 100. The control circuit 102 may detect an obstacle showing in the surrounding section 203 based on the data received through the communication circuit 103 and perform a corresponding operation. The control circuit 102 may detect an obstacle entering the charging section 202 based on data from the external sensor 410 or other sensors and perform a corresponding operation. The control circuit 102 may detect an obstacle exiting the charging section 202 based on data from the external sensor 410 or other sensors and perform a corresponding operation.

Figure 4C:
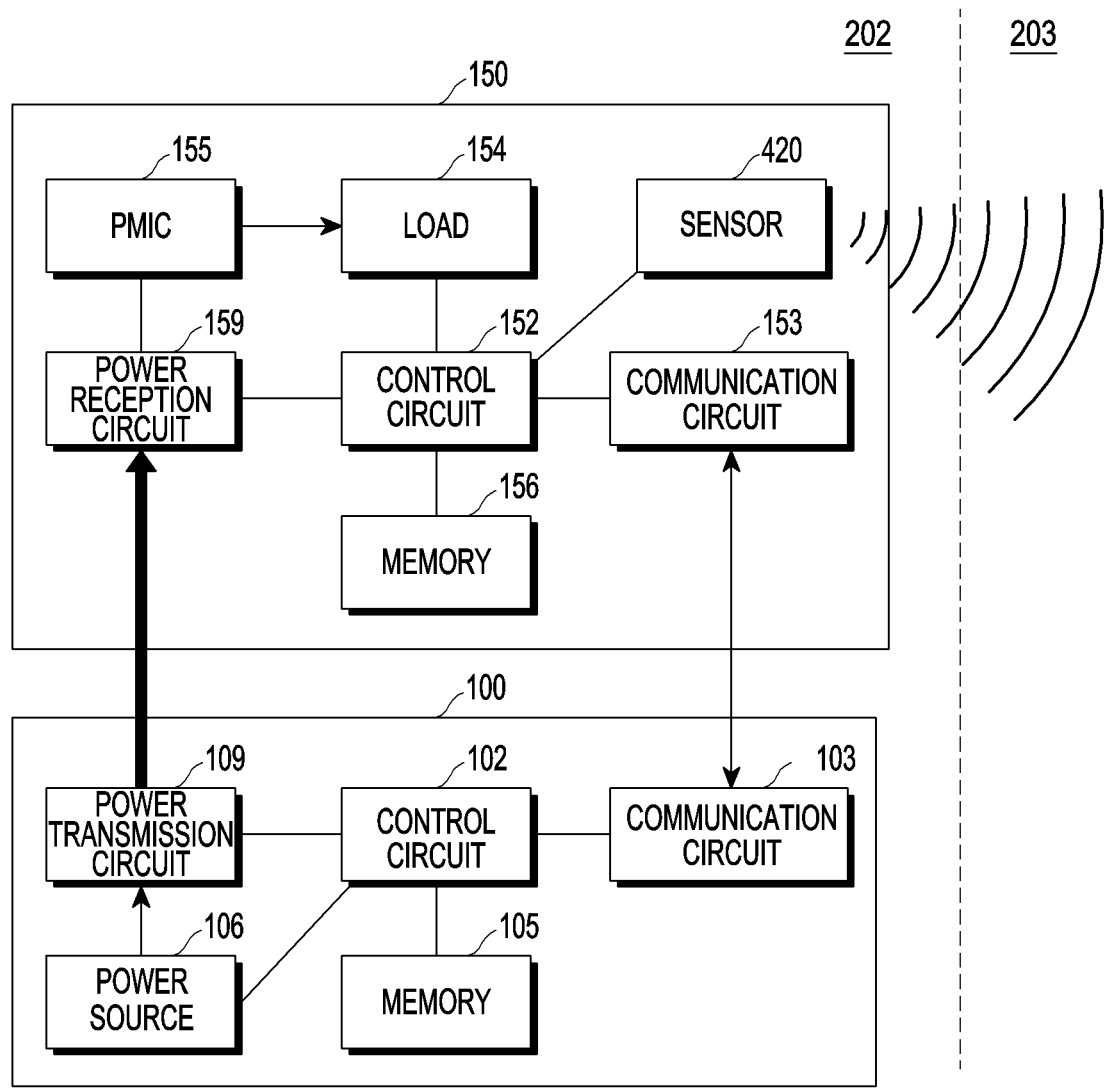
FIG. 4C is a block diagram of a wireless power transmitting device and an electronic device according to an embodiment.

FIG. 4C is a block diagram of a wireless power transmitting device and an electronic device according to an embodiment.

The wireless power transmitting device 100 shown in FIG. 4C may not include the sensor 104, as compared with the wireless power transmitting device 100 shown in FIG. 4A. The electronic device 150 may include a sensor 420. The sensor 420 may be similar to the sensor 104. The sensor 420 may sense data related to the surrounding section 203 and transmit the data sensed through the communication circuit 153 to the communication circuit 103 of the wireless power transmitting device 100. The control circuit 102 may detect an obstacle showing in the surrounding section 203 based on the data received through the communication circuit 103 and perform a corresponding operation. The control circuit 102 may detect an obstacle entering the charging section 202 based on data from the sensor 420 of the electronic device 150 or other sensors and perform a corresponding operation. The control circuit 102 may detect an obstacle exiting the charging section 202 based on data from the sensor 420 or other sensors and perform a corresponding operation.

Figure 4D:
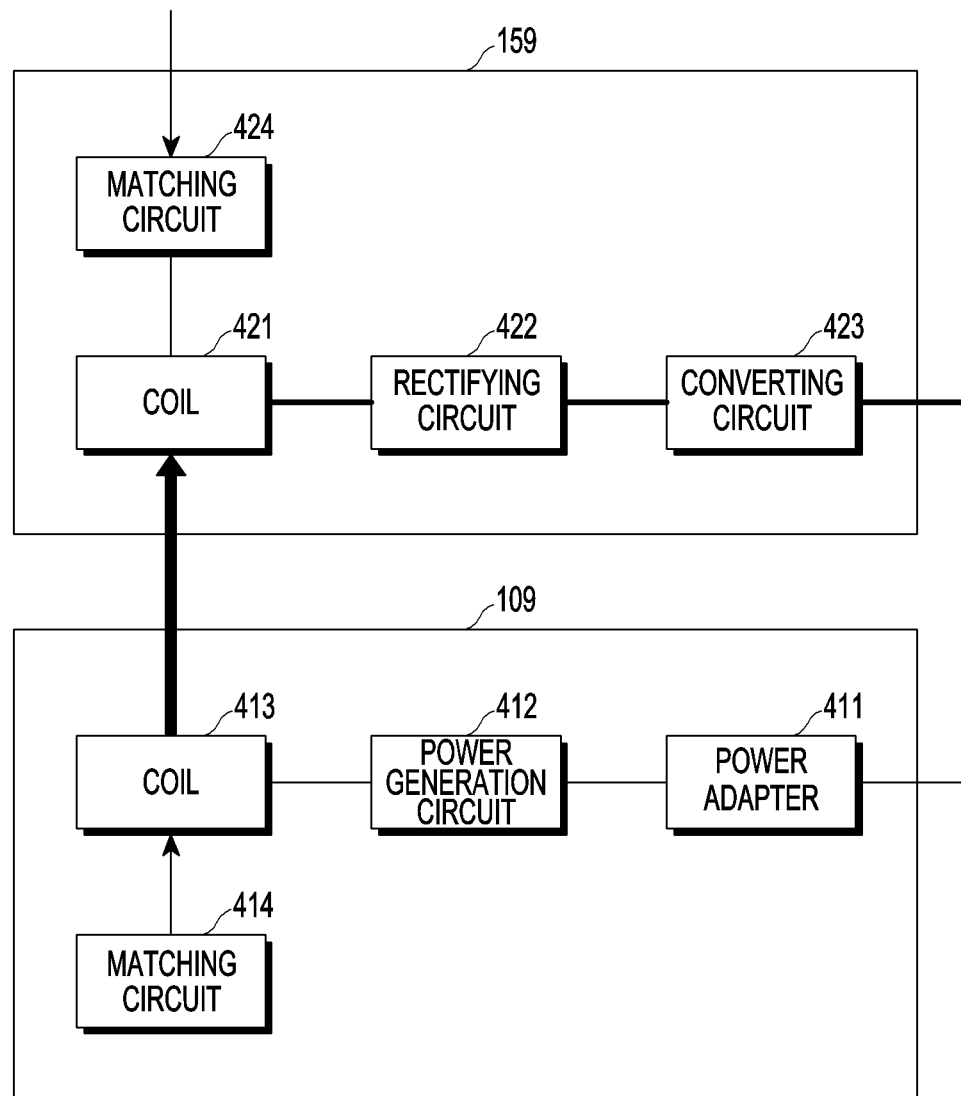
FIG. 4D is a block diagram of a power transmission circuit and a power reception circuit according to an induction scheme or a resonance method according to an embodiment.

FIG. 4D is a block diagram of a power transmission circuit and a power reception circuit according to an induction scheme or a resonance method according to an embodiment.

In an embodiment, the power transmission circuit 109 may include a power adapter 411, a power generation circuit 412, a coil 413, and a matching circuit 414. The power adapter 411 may receive power from the power source 106 and provide the power to the power generation circuit 412. The power generation circuit 412 may convert and/or amplify the received power into an AC waveform and transmit the received power (e.g., converted and/or amplified power) to the coil 413. When the power is applied to the coil 413, an induced magnetic field of which the magnitude changes as time passes may be formed by the coil 413, so that power is wirelessly transmitted. Capacitors constituting a resonance circuit in combination with the coil 413 may be further included in the power transmission circuit 109. The resonance frequency may be defined by a standard, (e.g., 100 to 205 kHz in accordance with Qi standard by an induction scheme or 6.78 MHz in accordance with AFA standard) by a resonance method. The matching circuit 414 may be controlled by the control circuit 102 to match impedances of the power transmission circuit 109 and the power reception circuit 159 by changing at least one of capacitance and reactance of a circuit connected to the coil 413. An induced electromotive force may be generated at the coil 421 of the power reception circuit 159 by a magnetic field that is generated around the coil 421 and of which the magnitude changes as time passes, and accordingly, the power reception circuit 159 may wirelessly receive power. A rectifying circuit 422 may rectify the received power having an AC waveform. A converting circuit 423 may adjust the voltage of the rectified power and transmit the power to the PMIC 155. The power reception circuit 159 may further include a regulator and the converting circuit 423 may be replaced by a regulator. The matching circuit 424 may be controlled by the control circuit 152 to match impedances of the power transmission circuit 109 or the power reception circuit 159 by changing at least one of capacitance and reactance of a circuit connected to the coil 421.

Figure 4E:
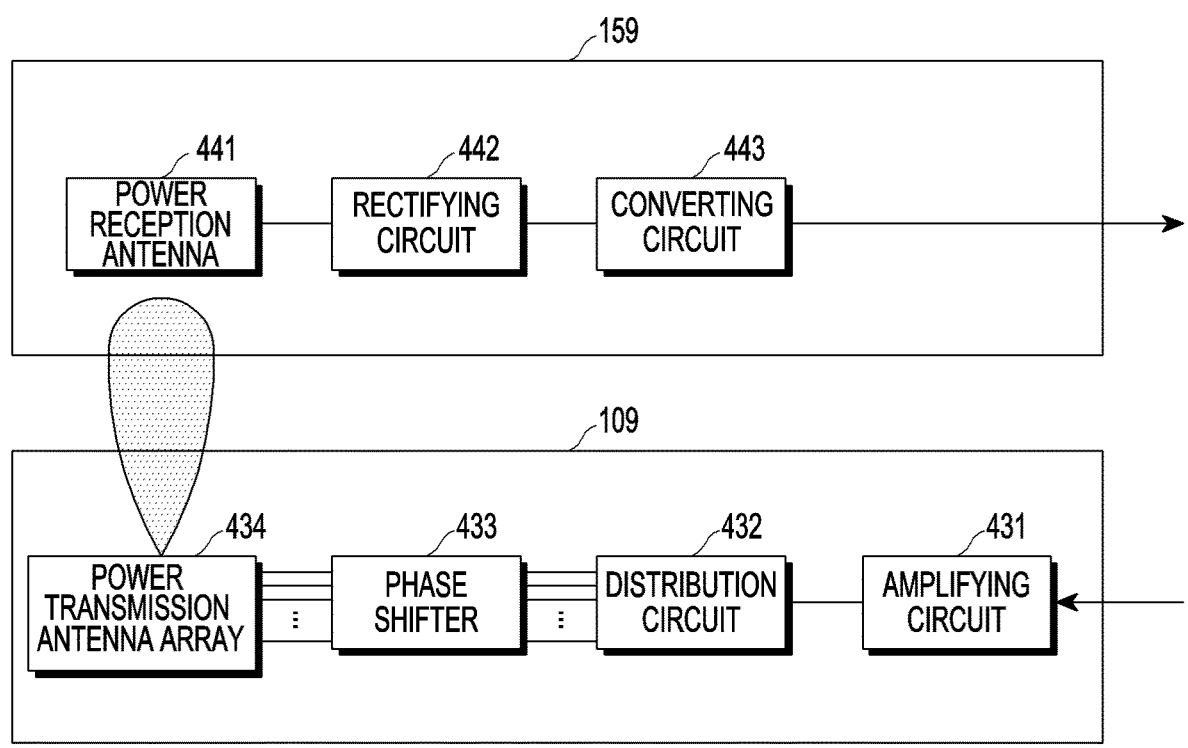
FIG. 4E is a block diagram of a power transmission circuit and a power reception circuit according to an electromagnetic wave scheme according to an embodiment.

FIG. 4E is a block diagram of a power transmission circuit and a power reception circuit according to an electromagnetic wave scheme according to an embodiment.

In an embodiment, the power transmission circuit 109 may include an amplifying circuit 431, a distribution circuit 432, a phase shifter 433, and a power transmission antenna array 434. In an embodiment, the power reception circuit 159 may include a power reception antenna 441, a rectifying circuit 442, and a converting circuit 443.

The amplifying circuit 431 may amplify power received from the power source 106 and provide the amplified power to the distribution circuit 432. The amplifying circuit 431 may be implemented by various amplifiers such as a driver amplifier (DA), a high-power amplifier (HPA), a gain block amplifier (GBA), or a combination thereof, but is not limited thereto. The distribution circuit 432 may distribute power output from the amplifying circuit 431 to a plurality of paths. If any circuit can distribute input power of signal to a plurality of paths, it is not limited as the distribution circuit 432. For example, the distribution circuit 432 may distribute power to paths corresponding to the number of patch antennas included in the power transmission antenna array 434. The phase shifter 433 may shift the phases (or delays) of a plurality of items of AC power provided from the distribution circuit 432. A plurality of phase shifters 433 may be provided, and, for example, as many phase shifters as the patch antennas included in the power transmission antenna arrays 434 may be provided. For example, a hardware element such as HMC642 or HMC1113 may be used as the phase shifter 433. The degree of shifting of the phase shifter 433 may be controlled by the control circuit 102. The control circuit 102 may determine the location of the electronic device 150 and shift the phases of a plurality of items of AC power to perform constructive interference or beam-forming on RF waves at the location of the electronic device 150 (or the location of the power reception antenna 414 of the electronic device 150). The patch antennas included in the power transmission antenna array 434 may generate sub-RF waves based on received power. RF waves interfered with the sub-RF waves may be converted into current, voltage, or power and then output by the power reception antenna 441. The power reception antenna 441 may include a plurality of patch antennas and generate current, voltage, or power of an AC waveform, using RF waves, that is, electromagnetic waves formed around it, in which the current, voltage, or power can be referred to as received power. The rectifying circuit 442 may rectify the received power into a DC waveform. The converting circuit 443 may increase or decrease the voltage of the power of a DC waveform to a predetermined value and then output the power to the PMIC 155.

Figure 5:
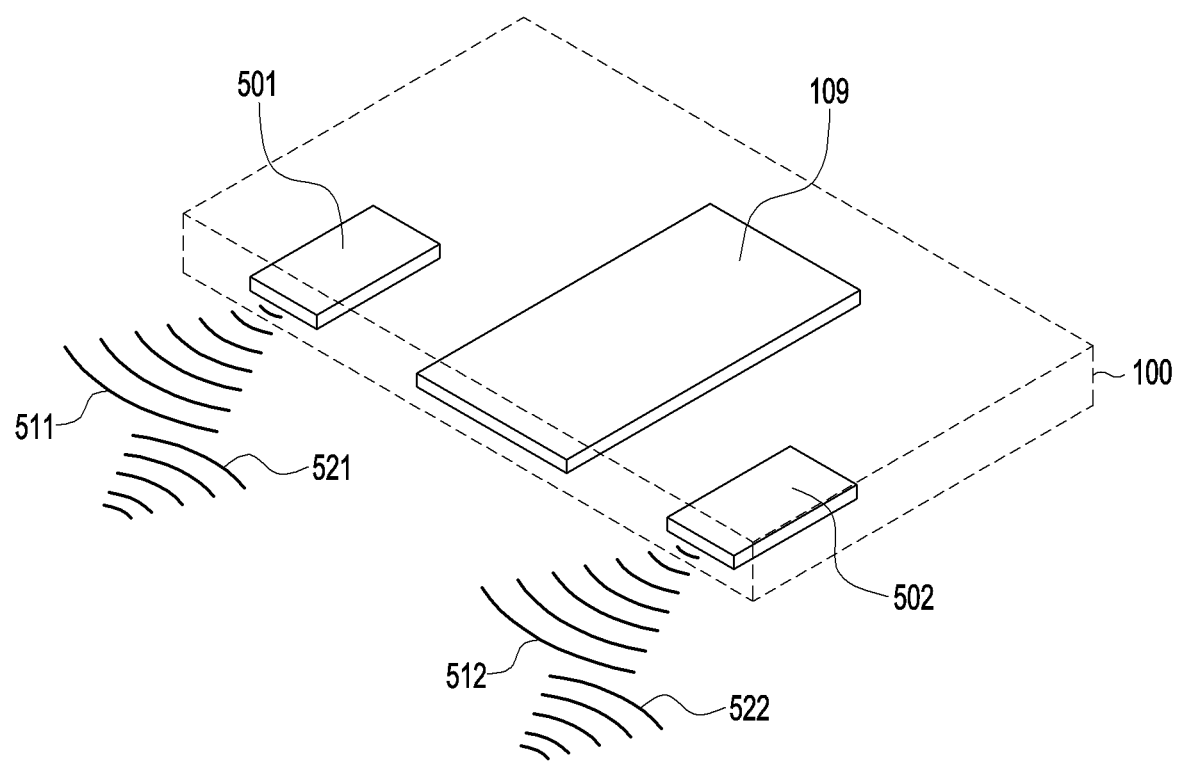
FIG. 5 is a conceptual diagram of a wireless power transmitting device according to an embodiment.

FIG. 5 is a conceptual diagram of a wireless power transmitting device according to an embodiment.

A wireless power transmitting device 100 according to an embodiment may include a power transmission circuit 109 and sensors 501 and 502. The sensors 501 and 502 may be implemented as communication circuits and transmit communication signals 511 and 512, respectively. The sensors 501 and 502 may be respectively positioned at the left and right sides from the power transmission circuit 109, and for example, they may be disposed at positions where they can transmit the communication signals 511 and 512 to surrounding sections at left and right sides of a charging section. The transmission signals 511 and 512 may be reflected by surrounding structures. Reflected waves 521 and 522 may travel to the sensors 501 and 502, respectively, and the sensors 501 and 502 may measure at least one of the amplitudes, phases, and time of flight of the reflected waves 521 and 522. At least one of the amplitude and phase of the reflected waves 521 and 522 may be changed in comparison to the communication signals 511 and 512. The wireless power transmitting device 100 may store, for example, reference information shown in Table 1.

TABLE 1

| Sensor number | Amplitude attenuation (dB) | Phase change (rad) | Time of flight (µs) |
|---|---|---|---|
| 501 | −2 | +13 | 0.12 |
| 502 | −4.1 | −3 | 0.28 |

Alternatively, the wireless power transmitting device 100 may store at least one of the amplitude and phase of received reflected waves. The wireless power transmitting device 100 may periodically or aperiodically receive the reflected waves 521 and 522 and measure the characteristics of the reflected waves. The wireless power transmitting device 100 may detect an obstacle showing in surrounding sections with reference to the reference information. For example, as in Table 1, the reference signal for the sensor 502 may be signal attenuation of −4.1 dB, a phase change of −3 rad, and time of flight of 0.28 µs. The wireless power transmitting device 100 may determine that a signal reflected at the second point of time has signal attenuation of −1.2 dB, a phase change of 40 rad, and time of flight of 0.12 µs in comparison to a communication signal. That is, the wireless power transmitting device 100 can find out that a difference of 2.9 dB was detected in the signal attenuation, a difference of 43 rad was detected in the phase change, and a difference of 0.16 µs was detected in the time of flight. When determining that the difference between the reference information and the characteristics of a reflected signal exceeds a threshold value, the wireless power transmitting device 100 may determine that an obstacle has appeared in the surrounding section corresponding to the corresponding sensor. In an embodiment, the wireless power transmitting device 100 may compare differences in the signal attenuation, phase change, and time of flight with threshold values set for factors or compare a sum of weights with threshold values set for the sum of weights. Alternatively, the wireless power transmitting device 100 may detect a presence of an obstacle based on a change in at least one of the amplitude and phase of a reflected wave. In an embodiment, the sensors 501 and 502 may be communication circuits for communicating with the electronic device 150 or may be general-purpose communication circuits not necessarily specifically designed to communicate only with the electronic device 150. In an embodiment, the electronic device 150 may include sensors that are implemented as communication circuits at the left and right side of a power reception circuit. The electronic device 150 may store characteristics of a reflected wave received from a communication circuit, for example, reference information as shown in Table 1, and then detect an obstacle showing in surrounding sections at left and right side of a charging section with reference to the reference information. When an obstacle is detected, the electronic device 150 may transmit a notification message about the appearance of the obstacle to the wireless power transmitting device 100. Alternatively, in an embodiment, an external sensor separately provided from the wireless power transmitting device 100 or the electronic device 150 may be implemented as a communication circuit and detect an obstacle by measuring a reflected wave. When an obstacle is detected, the external sensor may transmit appearance of the obstacle to the wireless power transmitting device 100.

Figure 6:
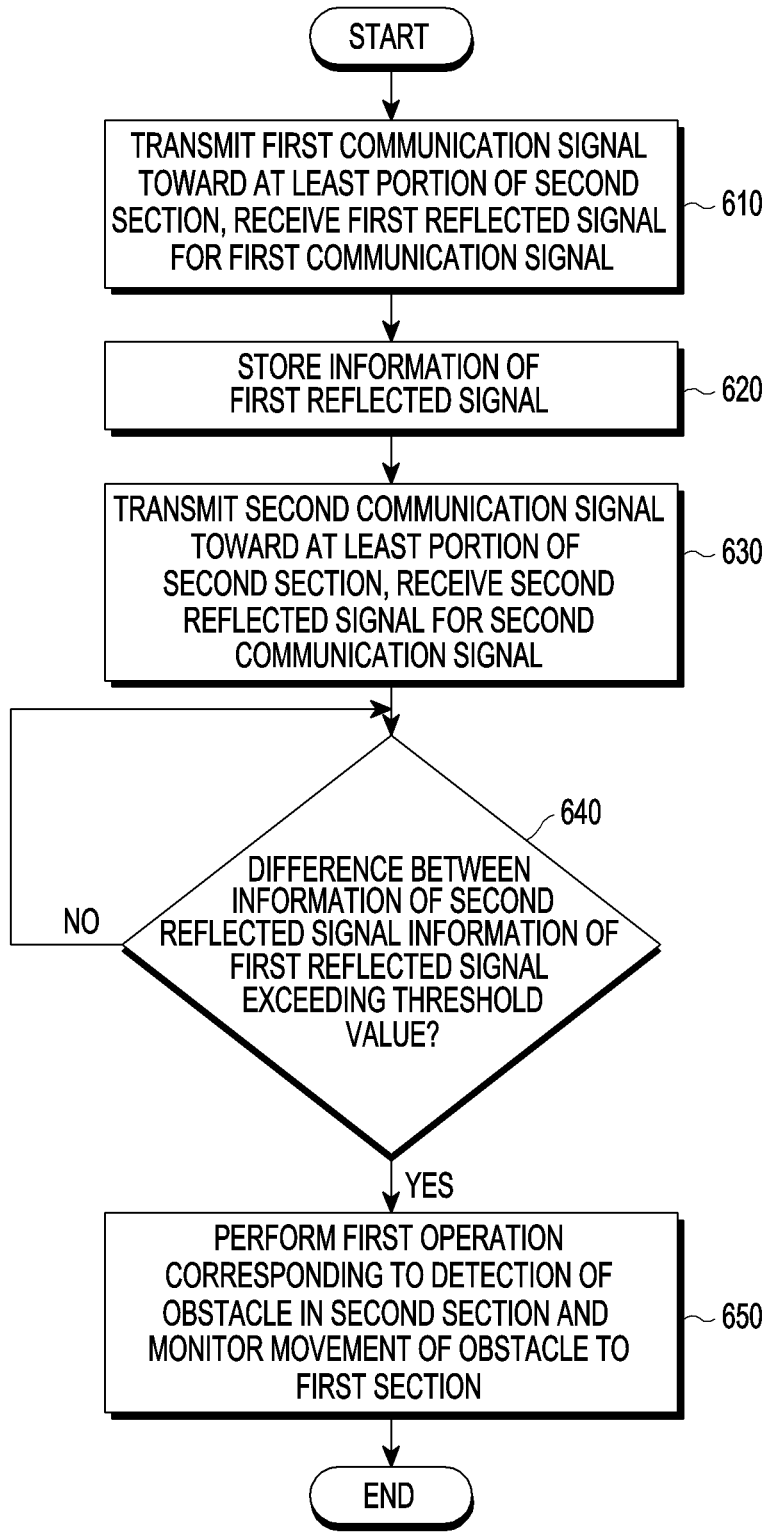
FIG. 6 is a flowchart illustrating a method of operating a wireless power transmitting device according to an embodiment.

FIG. 6 is a flowchart illustrating a method of operating a wireless power transmitting device according to an embodiment.

In operation 610, the wireless power transmitting device 100 may transmit a first communication signal toward at least a portion of the second section and receive a first reflected signal for the first communication signal. For example, the wireless power transmitting device 100 may control the first communication signal toward at least a portion of the second section. Alternatively, the wireless power transmitting device 100 may transmit a non-directional first communication signal, and in this case, a communication circuit that receives the first communication signal may be positioned to corresponding to the location of the second section.

In operation 620, the wireless power transmitting device 100 may store the information of the first reflected signal. The wireless power transmitting device 100 may store at least one of the amplitude, phase, amplitude attenuation, a phase change, and time of flight of the first reflected signal. In operation 630, the wireless power transmitting device 100 may transmit a second communication signal toward at least a portion of the second section and receive a second reflected signal for the second communication signal. The transmission condition for the second communication signal may be the same as that for the first communication signal. In operation 640, the wireless power transmitting device 100 may determine whether the difference between the information of the second reflected signal and the information of the first reflected signal exceeds a threshold value. When it is determined that the difference exceeds the threshold value, the wireless power transmitting device 100, in operation 650, may perform a first operation corresponding detection of an obstacle in the second section and monitor movement of the obstacle to the first section. Detection of an obstacle in the first section may be performed in the same way as detection of an obstacle in the second section and the wireless power transmitting device 100 may perform detection on an obstacle in the first section, using the same or different sensor. Alternatively, the wireless power transmitting device 100 may perform detection of an obstacle in a different way for the first section. In an embodiment, the wireless power transmitting device 100 may detect an obstacle in the first section in accordance with a rogue object detection method defined by various wireless charging standards. For example, the wireless power transmitting device 100 may measure a change in impedance in a resonance circuit and detect an obstacle in the first section when an advertisement signal is not received. The wireless power transmitting device 100 may include an ultrasonic transmission/reception circuit, instead of a communication circuit, as a sensor. The wireless power transmitting device 100 may transmit an ultrasonic wave and receive a reflected wave for the ultrasonic wave and may also detect an obstacle based on the characteristics of the reflected signal.

Figure 7:
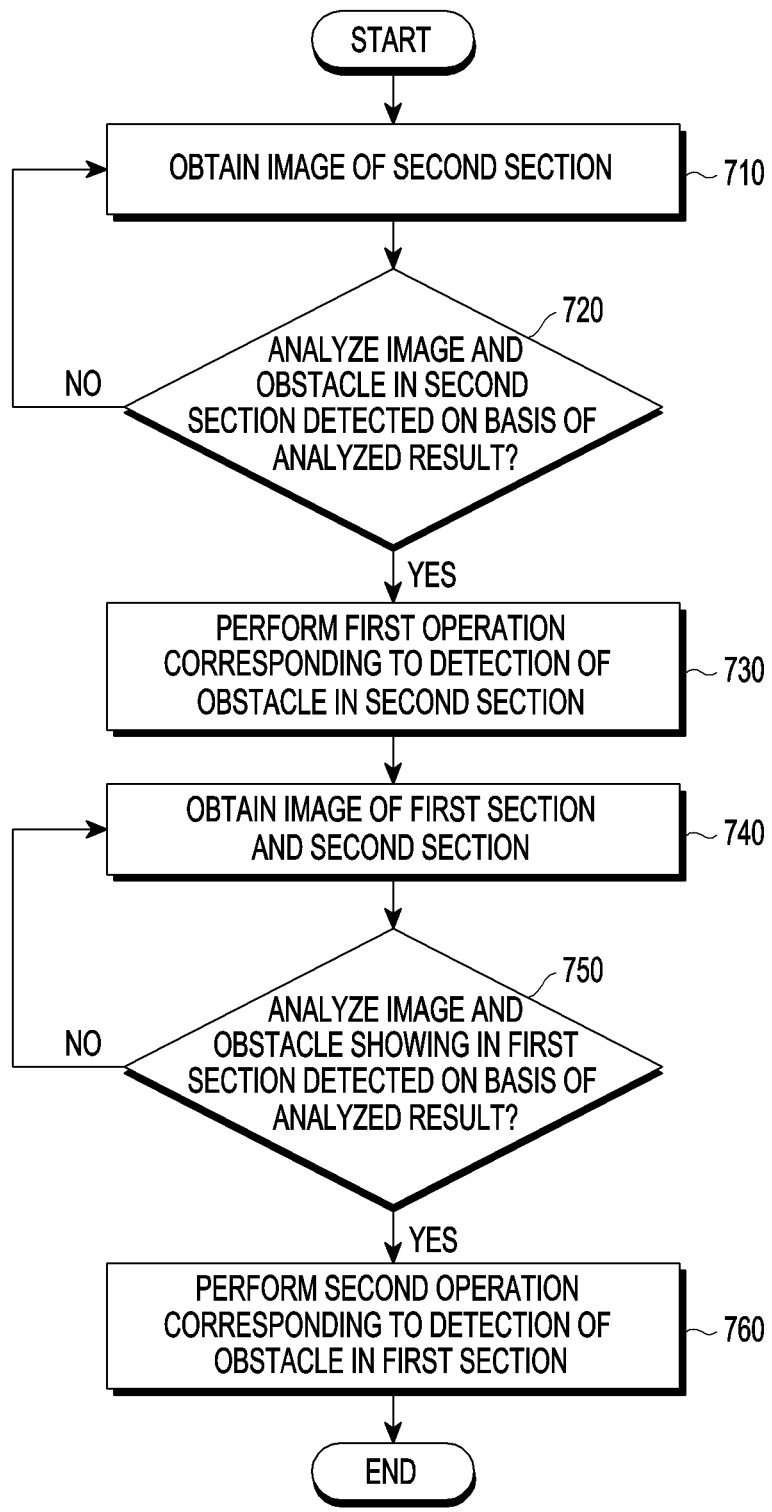
FIG. 7 is a flowchart illustrating a method of operating a wireless power transmitting device according to an embodiment.

FIG. 7 is a flowchart illustrating a method of operating a wireless power transmitting device according to an embodiment.

In operation 710, the wireless power transmitting device 100 according to an embodiment may obtain an image of the second section around the electronic device 150, for example, an image of a surrounding section. The wireless power transmitting device 100 may include a camera that can photograph the second section and obtain an image of the second section through the camera. Alternatively, the electronic device 150 may include a camera that can photograph the second section, for example, a surrounding section. The electronic device 150 may transmit the image obtained through the camera to the wireless power transmitting device 100 and the wireless power transmitting device 100 may obtain the image of the second section from the electronic device 150. Alternatively, another electronic device other than the wireless power transmitting device 100 or the electronic device 150 may include a camera for photographing the second section around the electronic device 150. The other electronic device may transmit the image obtained through the camera to the wireless power transmitting device 100 and the wireless power transmitting device 100 may obtain the image of the second section from another electronic device. The camera may be a common camera for taking two-dimensional (2D) images or a depth camera that can obtain three-dimensional (3D) information.

In operation 720, the wireless power transmitting device 100 may analyze the image and determine whether an obstacle has been detected in the second section based on the analyzed result. For example, the wireless power transmitting device 100 may store an image when there is no obstacle in the second section as a reference image and compare an obtained image with the reference image. The wireless power transmitting device 100 may determine whether an obstacle has been detected in the second section based on the comparing result. The wireless power transmitting device 100 may recognize the electronic device 150, for example, a TV from the obtained image and determine ports corresponding to the charging section and the surrounding section in the image based on the location of the recognized TV. The wireless power transmitting device 100 may determine the portion based on an object corresponding to the TV (e.g., the portion in front of an object corresponding to the TV) in the image as the portion corresponding to the charging section and the portions at the left and right sides of the charging section in the image as the portion corresponding to the surrounding sections. The wireless power transmitting device 100 may determine whether an object that had not existed has been detected in the portions corresponding to the surrounding sections, so it may determine whether an obstacle has appeared in the surrounding sections. The wireless power transmitting device 100 may recognize that a specific object in an image is an electronic device such as a TV, for example, by detecting the difference in brightness of a TV when the TV was turned on and off, and detect an electronic device that wirelessly receive power based on a method of recognizing things in various images.

When it is determined that an obstacle has been detected in the second section, the wireless power transmitting device 100 may perform a first operation corresponding to detection of an obstacle in the second section in operation 730. In operation 740, the wireless power transmitting device 100 may obtain images of the first section (e.g., the charging section) and the second section. The wireless power transmitting device 100 may obtain images of the first section and the second section through the camera included in the wireless power transmitting device 100, as described above, or obtain images of the first section and the second section from the electronic device 150, or obtain images of the first section and the second section from another electronic device. The images obtained in operation 730 and the images obtained in operation 710 may be the same or different. When the images obtained in operation 730 and the images obtained in operation 710 are different, the photographing direction of the camera included in the wireless power transmitting device 100, the electronic device 150, or another electronic device is changed and the wireless power transmitting device 100 may obtain images of the first section and the second section. Alternatively, the wireless power transmitting device 100 may obtain an image of the first section.

In operation 750, the wireless power transmitting device 100 may analyze the images and determine whether an obstacle has been detected in the first section based on the analyzed result. When it is determined that an obstacle has shown in the first section, the wireless power transmitting device 100 may perform a second operation corresponding to detection of an obstacle in the first section in operation 760.

The wireless power transmitting device 100 may detect an obstacle, using a proximity sensor etc. other than the method described above, so the method that may detect an obstacle is not limited.

Figure 8:
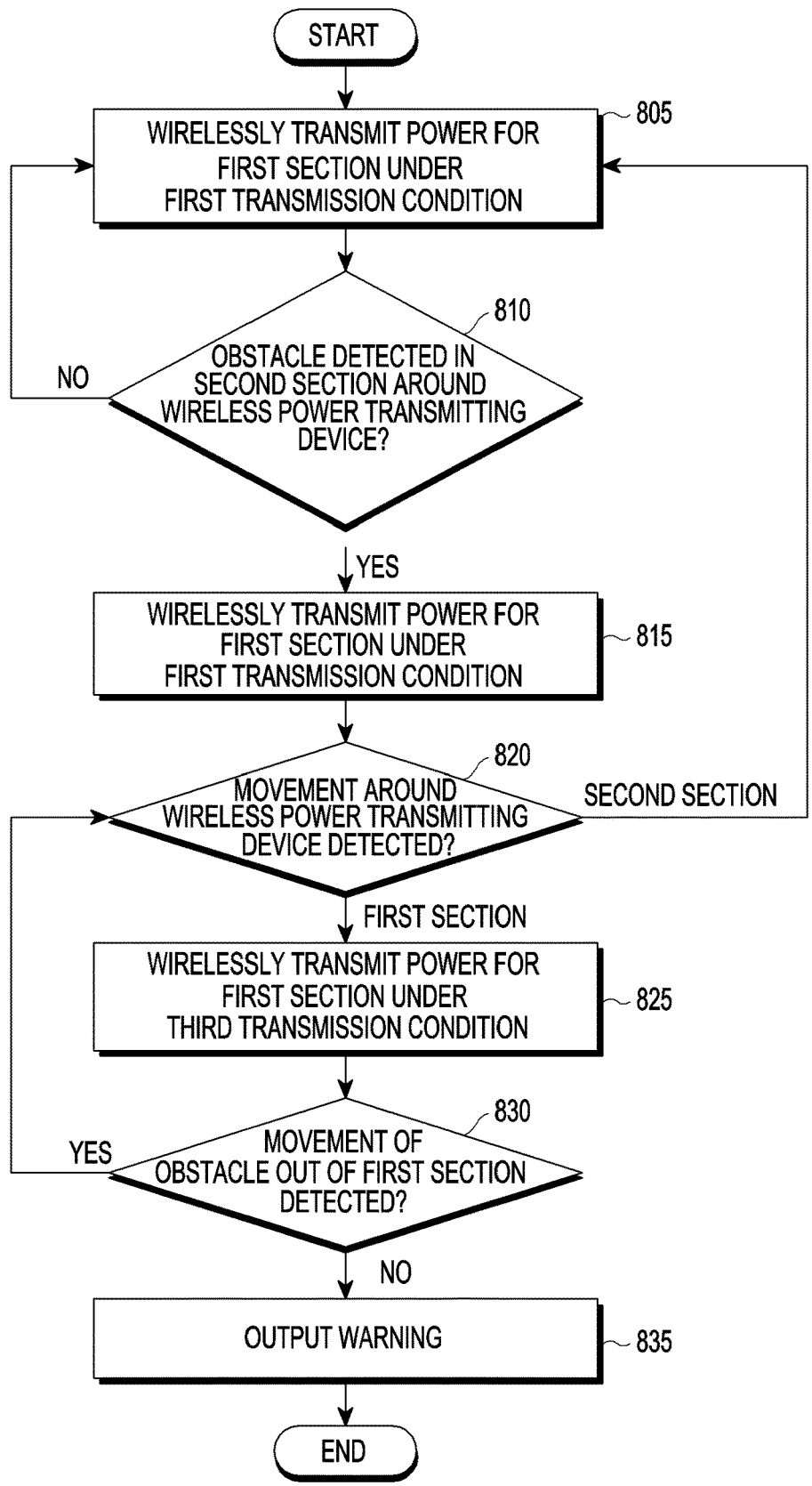
FIG. 8 is a flowchart illustrating a method of operating a wireless power transmitting device according to an embodiment.

FIG. 8 is a flowchart illustrating a method of operating a wireless power transmitting device according to an embodiment.

In operation 805, the wireless power transmitting device 100 according to an embodiment may wirelessly transmit power for the first section under a first transmission condition. The transmission condition may be conditions related to the intensity of power to be transmitted, for example, the intensity of current to be applied to a coil, the intensity of voltage to be applied to a coil, and the intensity of power to be applied to a coil. Alternatively, the transmission condition may be a condition related to the transmission direction of power, for example, the intensity of current input to a plurality of patch antennas and the degree of phase delay of current input to a plurality of patch antennas. In operation 810, the wireless power transmitting device 100 may determine whether an obstacle has been detected in the second section (e.g., a surrounding section) around the wireless power transmitting device 100. When an obstacle is detected in the second section, in operation 815, the wireless power transmitting device 100 may wirelessly transmit power for the first section under a second transmission condition. The wireless power transmitting device 100 may change at least one of the condition related to the intensity of power to be transmitted and the condition related to the transmission direction of power based on the second transmission condition.

In operation 820, the wireless power transmitting device 100 may detect whether obstacle in the second section moves. When determining that the obstacle moves out of the second section, in operation 805, the wireless power transmitting device 100 may wirelessly transmit power again under the first transmission condition. When it is determined that the obstacle has moved into the first section (e.g., the charging section), in operation 825, the wireless power transmitting device 100 may wirelessly transmit power for the first section under a third transmission condition. The wireless power transmitting device 100 may change at least one of the condition related to the intensity of power to be transmitted and the condition related to the transmission direction of power based on the third transmission condition. In operation 830, the wireless power transmitting device 100 may detect that the obstacle moves out of the first section. When the obstacle exits the first section, the wireless power transmitting device 100 may wirelessly transmit power under the second transmission condition. When it is determined that the obstacle has not left the first section, the wireless power transmitting device 100 may output a warning in operation 835. When determining the obstacle stays in the first section, the wireless power transmitting device 100 may maintain the power transmission under the third transmission condition.

Figure 9:
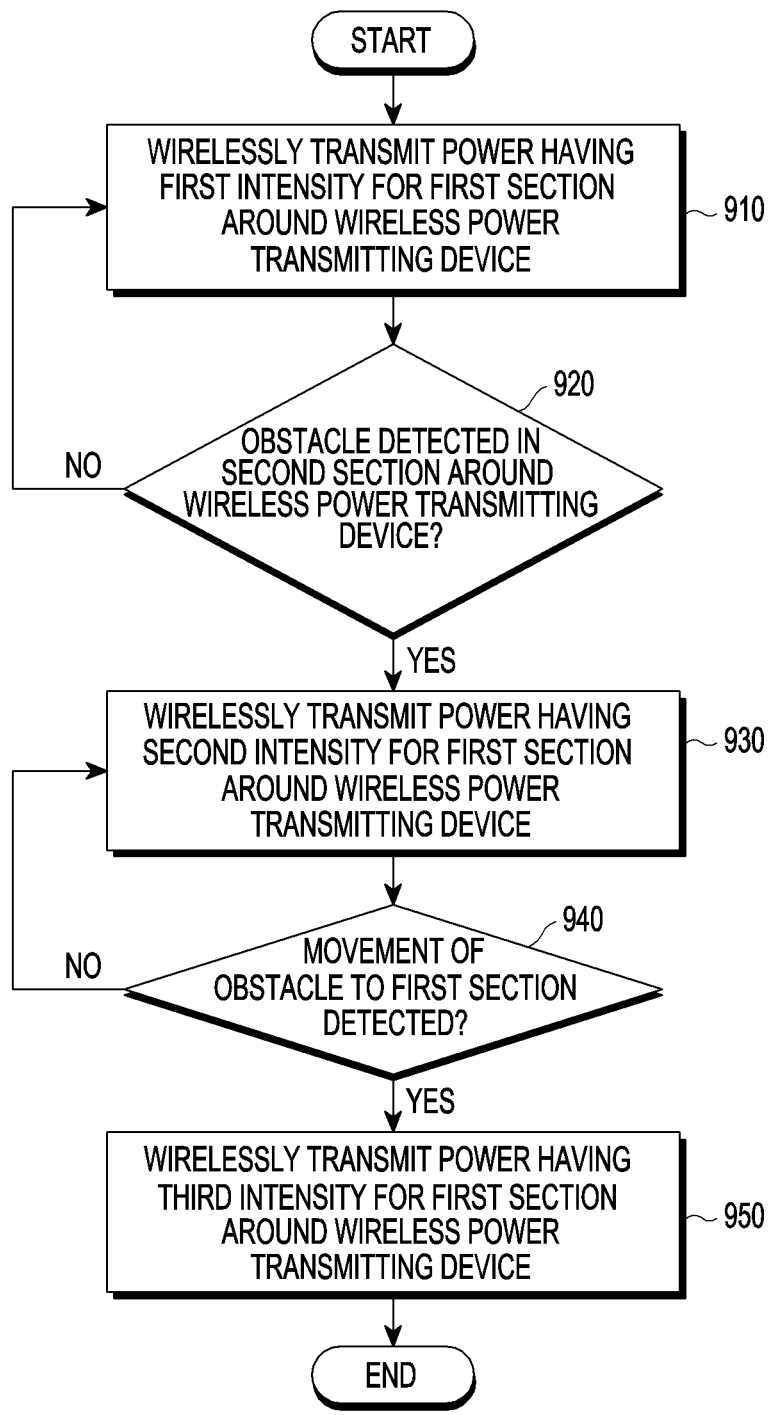
FIG. 9 is a flowchart illustrating a method of operating a wireless power transmitting device according to an embodiment.

FIG. 9 is a flowchart illustrating a method of operating a wireless power transmitting device according to an embodiment.

In operation 910, the wireless power transmitting device 100 according to an embodiment may wirelessly transmit power having first intensity for the first section around the wireless power transmitting device 100. For example, the wireless power transmitting device 100 may transmit power of first intensity for driving the electronic device 150. The wireless power transmitting device 100 may obtain information related to the electronic device (e.g., identification information and rated power information) and determine the first intensity based on the information. The wireless power transmitting device 100 may also obtain information about operation that is performed by the electronic device 150 or information about the current state of the electronic device 150, and may also determine the first intensity based on the information. For example, the wireless power transmitting device 100 may obtain information about the current brightness and the magnitude of volume of a TV and wirelessly transmit power corresponding to power of the first intensity corresponding to the information.

In operation 920, the wireless power transmitting device 100 may detect an obstacle showing in the second section (e.g., a surrounding section) around the wireless power transmitting device 100. As described above, the wireless power transmitting device 100 may detect an obstacle showing in the second section, using the characteristics of a reflected wave, the result of analyzing an image, or sensing data from various sensors. In operation 930, the wireless power transmitting device 100 may wirelessly transmit power having second intensity for the first section (e.g., the charging section) around the wireless power transmitting device 100. The second intensity may be less than or equal to the first intensity. In operation 940, the wireless power transmitting device 100 may detect that the obstacle moves to the first section. When it is detected that the obstacle moves to the first section, in operation 950, the wireless power transmitting device 100 may wirelessly transmit power having third intensity for the first section around the wireless power transmitting device 100. The third intensity may be less than or equal to the second intensity. When the wireless power transmitting device 100 intends to reduce the intensity of the power that is transmitted, it may reduce the intensity of the power after transmitting a command to reduce required power first to the electronic device 150. Accordingly, even if the wireless power transmitting device 100 reduces the intensity of the power that is transmitted, it is possible to prevent the electronic device 150 from being turned off due to receiving less power than required.

Figure 10:
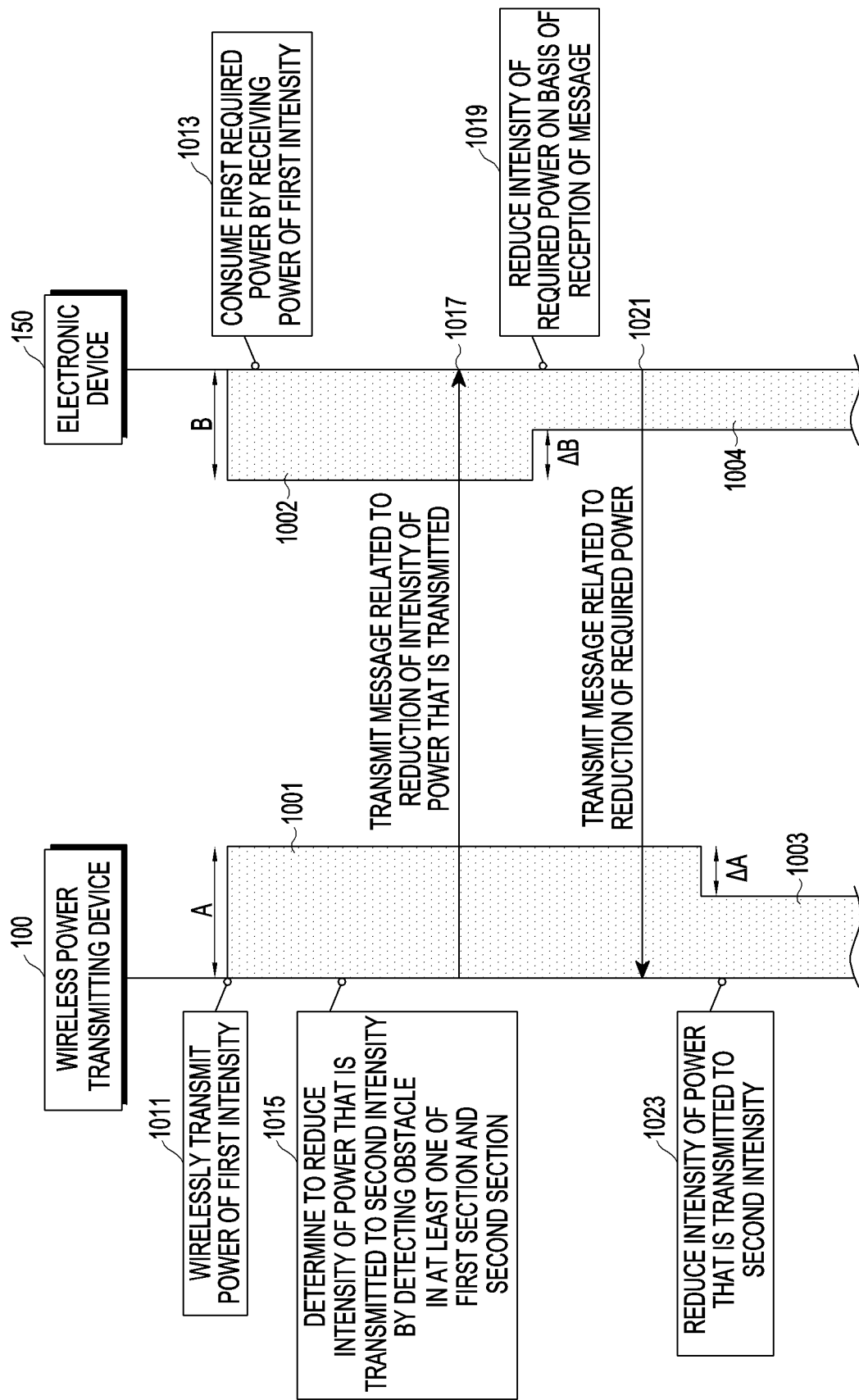
FIG. 10 is a timing diagram illustrating a method of operating a wireless power transmitting device.

FIG. 10 is a timing diagram illustrating a method of operating a wireless power transmitting device.

In operation 1011, the wireless power transmitting device 100 according to an embodiment may wirelessly transmit power 1001 having first intensity A. When the wireless power transmitting device 100 transmits the power 1001 having the first intensity A, it may mean that the wireless power transmitting device 100 applies current or voltage having intensity corresponding to the power having the first intensity A to a coil or a patch antenna. In operation 1013, the electronic device 150 according to various embodiments, can receive power 1002 having third intensity B and consume first required power. For example, when the electronic device 150 is the TV 151 shown in FIG. 1B, the electronic device 150 can display media data through a display, using the received power 201. The magnetic field corresponding to the power 1001 having the first intensity A may be attenuated, depending on the distance between the wireless power transmitting device 100 and the electronic device 150, and accordingly, the third intensity B of the power 1002 that the electronic device 150 receives may be smaller than the first intensity A. When the electronic device 150 is the TV 151, the electronic device 150 can display media data with first brightness, and accordingly, the first required power can be consumed.

In operation 1015, the wireless power transmitting device 100 according to various embodiments can detect an obstacle showing in at least one of the first section and the second section and can determine to reduce the intensity of the power that is transmitted to the second intensity. The wireless power transmitting device 100 can transmit a message related to reduction of the intensity of the power that is transmitted in operation 1017 before reducing the intensity of the power that is transmitted to the second intensity. In operation 1019, the electronic device 150 can reduce the intensity of required power based on reception of the message. For example, when the electronic device 150 is the TV 151, the electronic device 150 may display media data with second brightness that is darker than the first brightness, and accordingly, second required power less than the first required power may be consumed. In operation 1021, the electronic device 150 may transmit a message related to reduction of required power to the wireless power transmitting device 100. In operation 1023, the wireless power transmitting device 100 may reduce the intensity of power 1003 that is transmitted to the second intensity (A-AA). The electronic device 150 may receive power 1004 having fourth intensity (B-AB). The fourth intensity (B-AB) may be greater than the intensity of the second required power, so it is possible to prevent the electronic device 150 from being turned off due to the small intensity of power received. For example, the wireless power transmitting device 100 may store related information shown in Table 2.

TABLE 2

| State of electronic device | Power to transmit |
| --- | --- |
| Brightness 1 | 30 W |
| Brightness 2 | 45 W |
| Brightness 3 | 60 W |
| Brightness 4 | 75 W |

For example, when an obstacle is not detected, the wireless power transmitting device 100 may transmit power of 75 W so that the TV 151 can display media data with the brightness 4. The wireless power transmitting device 100 may determine to reduce the intensity of the power that is transmitted from 75 W to 60 W based on detection of the obstacle in the second section (e.g., a surrounding section). The wireless power transmitting device 100 may transmit a message for adjusting the brightness from the brightness 4 to the brightness 3 to the TV 151 before reducing the intensity of the power that is transmitted. The TV 151 may adjust the brightness from the brightness 4 to the brightness 3 based on the received message. After the TV 151 reduces the required power, the wireless power transmitting device 100 may reduce the intensity of the power that is transmitted from 75 W to 60 W. The wireless power transmitting device 100 may detect that the obstacle moves to the first section (for example, the charging section). The wireless power transmitting device 100 can determine to reduce the intensity of the power that is transmitted from 60 W to 30 W based on detection of the obstacle in the first section. The wireless power transmitting device 100 can transmit a message for adjusting the brightness from the brightness 3 to the brightness 1 to the TV 151 before reducing the intensity of the power that is transmitted. The TV 151 can adjust the brightness from the brightness 3 to the brightness 1 based on the received message. After the TV 151 reduces the required power, the wireless power transmitting device 100 may reduce the intensity of the power that is transmitted from 60 W to 30 W. In an embodiment, the electronic device 150 may adjust the required power by adjusting not only the brightness, but various states. The wireless power transmitting device 100 may reduce the required power of the electronic device 150 before reducing the intensity of the power that is transmitted. In an embodiment, the electronic device 150 may detect an obstacle in at least one of the first section and the second section. In this case, the electronic device 150 may reduce the required power and then request the wireless power transmitting device 100 to reduce the intensity of the power that is transmitted.

Figure 11:
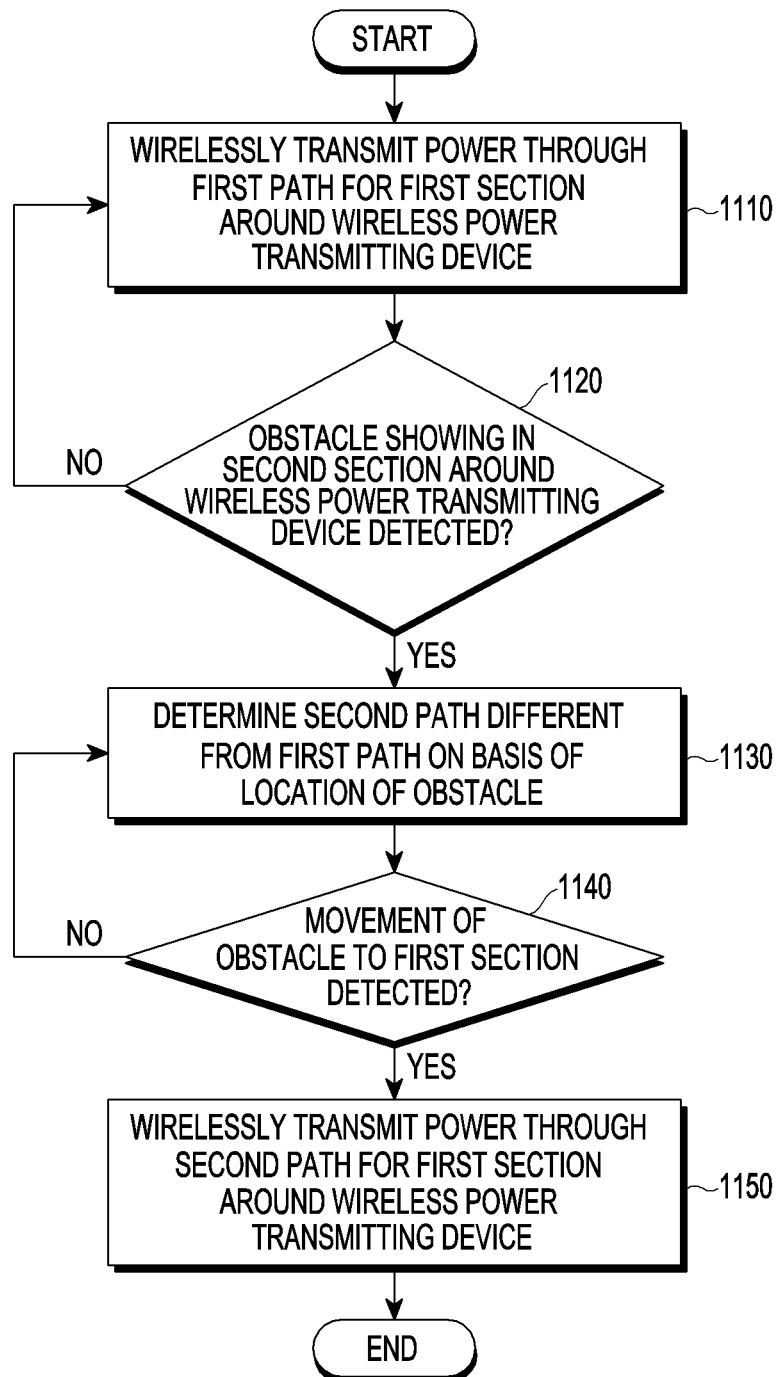
FIG. 11 is a flowchart illustrating a method of operating a wireless power transmitting device according to an embodiment.
Figure 12:
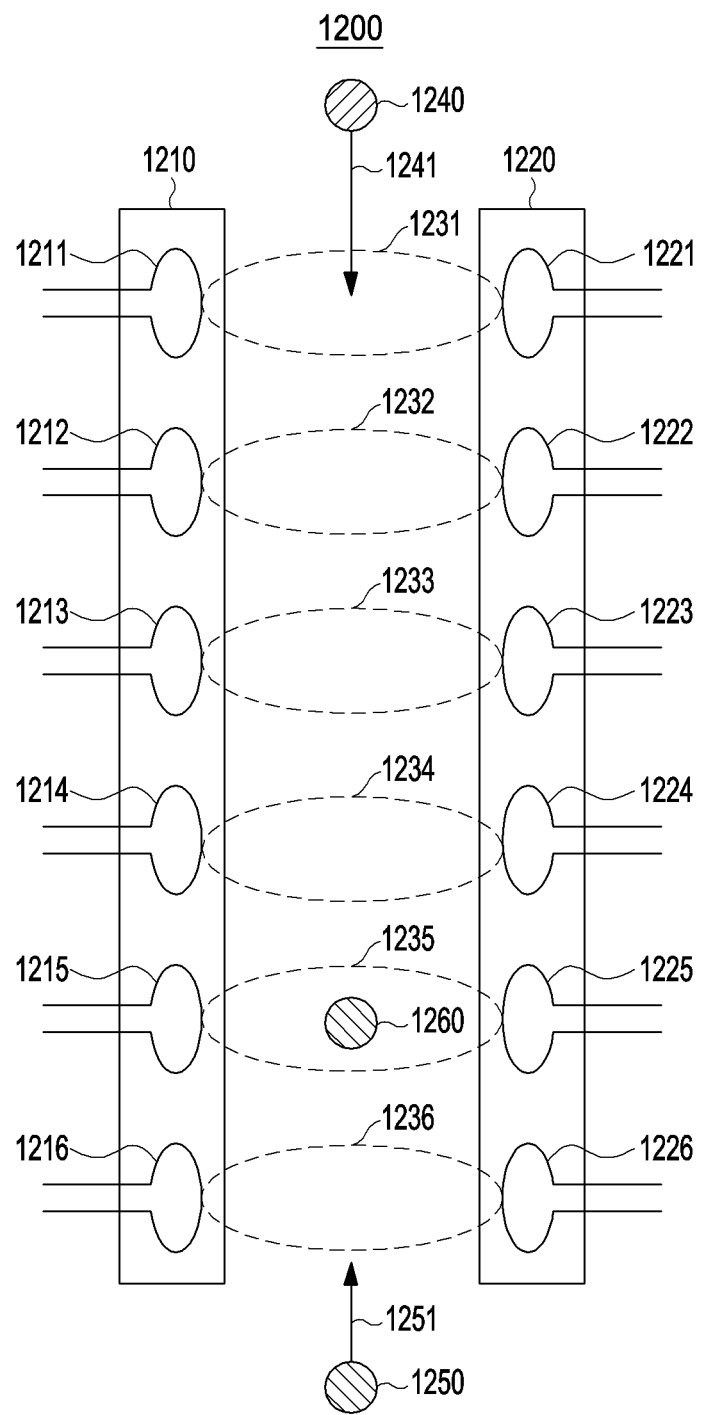
FIG. 12 is a diagram illustrating changing power transmission paths using a plurality of coils according to an embodiment.
Figure 13:
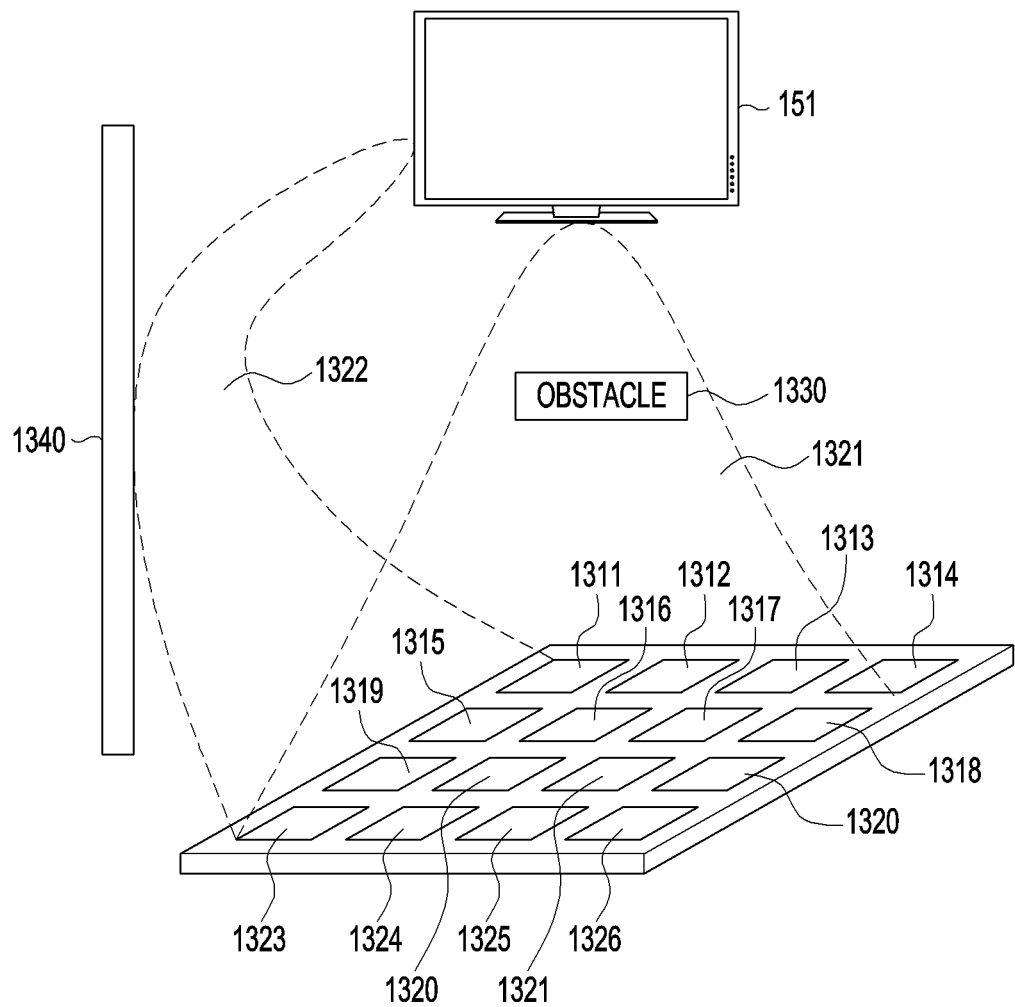
FIG. 13 is a diagram illustrating changing power transmission paths using a plurality of patch antennas according to an embodiment.

FIG. 11 is a flowchart illustrating a method of operating a wireless power transmitting device according to an embodiment. The embodiment shown in FIG. 11 will be described in more detail with reference to FIGS. 12 and 13. FIG. 12 is a diagram illustrating changing power transmission paths using a plurality of coils according to an embodiment. FIG. 13 is a diagram illustrating changing power transmission paths using a plurality of patch antennas according to an embodiment.

In operation 1110, the wireless power transmitting device 100 according to an embodiment may wirelessly transmit power for the first section (e.g., the charging section) around the wireless power transmitting device 100 through a first path. In operation 1120, the wireless power transmitting device 100 may detect an obstacle showing in the second section (e.g., a surrounding section) around the wireless power transmitting device 100. When an obstacle is detected, in operation 1130, the wireless power transmitting device 100 may determine a second path different from the first path based on the location of the obstacle. Referring to FIG. 12, a power transmission circuit 1200 of the wireless power transmitting device 100 may include a plurality of transmission coils 1211 to 1216 and a power reception circuit 1220 of the electronic device 150 may include a plurality of reception coils 1221 to 1226. The of transmission coils 1211 to 1216 may form magnetic couplings 1231 to 1236, respectively. The wireless power transmitting device 100 may determine that a first obstacle 1240 has entered the charging section in a downward direction 1241. In this case, for example, the wireless power transmitting device 100 may control the circuits so as not to form the first magnetic coupling 1231 by not applying a current to the first transmission coil 1211. Accordingly, the wireless power transmitting device 100 may wirelessly transmit power, using a first power transmission path corresponding to the second magnetic coupling 1232 to the sixth magnetic coupling 1236. The wireless power transmitting device 100 may determine that a second obstacle 1250 has entered the charging section in an upward direction 1251. In this case, for example, the wireless power transmitting device 100 may control the circuits so as not to form the sixth magnetic coupling 1236 by not applying a current to the sixth transmission coil 1216. Accordingly, the wireless power transmitting device 100 may wirelessly transmit power, using a second power transmission path corresponding to the first magnetic coupling 1231 to the fifth magnetic coupling 1235. As described above, the wireless power transmitting device 100 may set transmission paths by setting activation coils and inactivation coils of the coils 1211 to 1216. In other words, the wireless power transmitting device 100 may set the transmission paths by activating a first portion of the coils 1211 to 1216 while deactivating a second portion of the coils 1211 to 1216.

In operation 1140, the wireless power transmitting device 100 may detect that the obstacle has moved to the first section. When it is determined that the obstacle has moved to the first section, in operation 1150, the wireless power transmitting device 100 may wirelessly transmit power for the first section around the wireless power transmitting device 100 through the second path. The wireless power transmitting device 100 may determine that a third obstacle 1260 is present at the location where the fifth magnetic coupling 1235 is formed. The wireless power transmitting device 100 may determine a power transmission path, depending on the location of an obstacle in the charging section, and for example, it can control the circuits so as not to form the fifth magnetic coupling 1235 by not applying current to the fifth coil 1215. Accordingly, the wireless power transmitting device 100 may wirelessly transmit power, using a second power transmission path corresponding to the first magnetic coupling 1231 to the fourth magnetic coupling 1234, and the sixth magnetic coupling 1236.

Referring to FIG. 13, the wireless power transmitting device 100 according to an embodiment may include a plurality of patch antennas 1311 to 1326. The configuration, shapes, number, and layout of patch antennas 1311 to 1326 are not limited to what is shown in FIG. 13 as long as they can generate an RF wave 1321 or 1322. At least one of the amplitude and phase of RF waves generated by the patch antennas 1311 to 1326 may be adjusted by a processor 102 of the wireless power transmitting device 100. For the convenience of description, RF waves that are generated by the patch antennas 1311 to 1326 are referred to as sub-RF waves. In an embodiment, the wireless power transmitting device 100 may adjust at least one of the amplitude and phase of the sub-RF waves generated by the patch antennas 1311 to 1326. The sub-RF waves may interfere with each other. For example, the sub-RF waves may constructively interfere with each other at any one point and may destructively interfere with each other at another point. The wireless power transmitting device 100 may control at least one of the phase and amplitude of electrical signals input to the patch antennas 1311 and 1326 so that the sub-RF waves interfere constructively with each other at the position of the reception patch antenna of the TV 151. The wireless power transmitting device 100 may determine that an obstacle 1330 is positioned on the path of a beam-formed RF wave 1321. The wireless power transmitting device 100 may control at least one of the phase and amplitude of electrical signals input to the patch antennas 1311 and 1326 so that the RF wave 1330 is formed, avoiding the obstacle 1330. The RF wave 1322, for example, may be reflected from a structure 1340 (e.g., a wall, a column, furniture, etc.) around the TV 151 and constructively interfered at the position of the reception patch antenna of the TV 151. For example, the wireless power transmitting device 100 may determine the degree of adjustment of at least one of the phase and amplitude of electrical signals, which are input to the patch antennas 1311 to 1326 to form the RF wave 1322, based on detection of the obstacle 1330 in a surrounding section of the charging section. When it is detected that the obstacle 1330 has entered the charging section, the wireless power transmitting device 100 may adjust at least one of the phase and amplitude of electrical signals input to the patch antennas 1311 and 1326 so that the sub-RF wave 1322 is formed.

Figure 14:
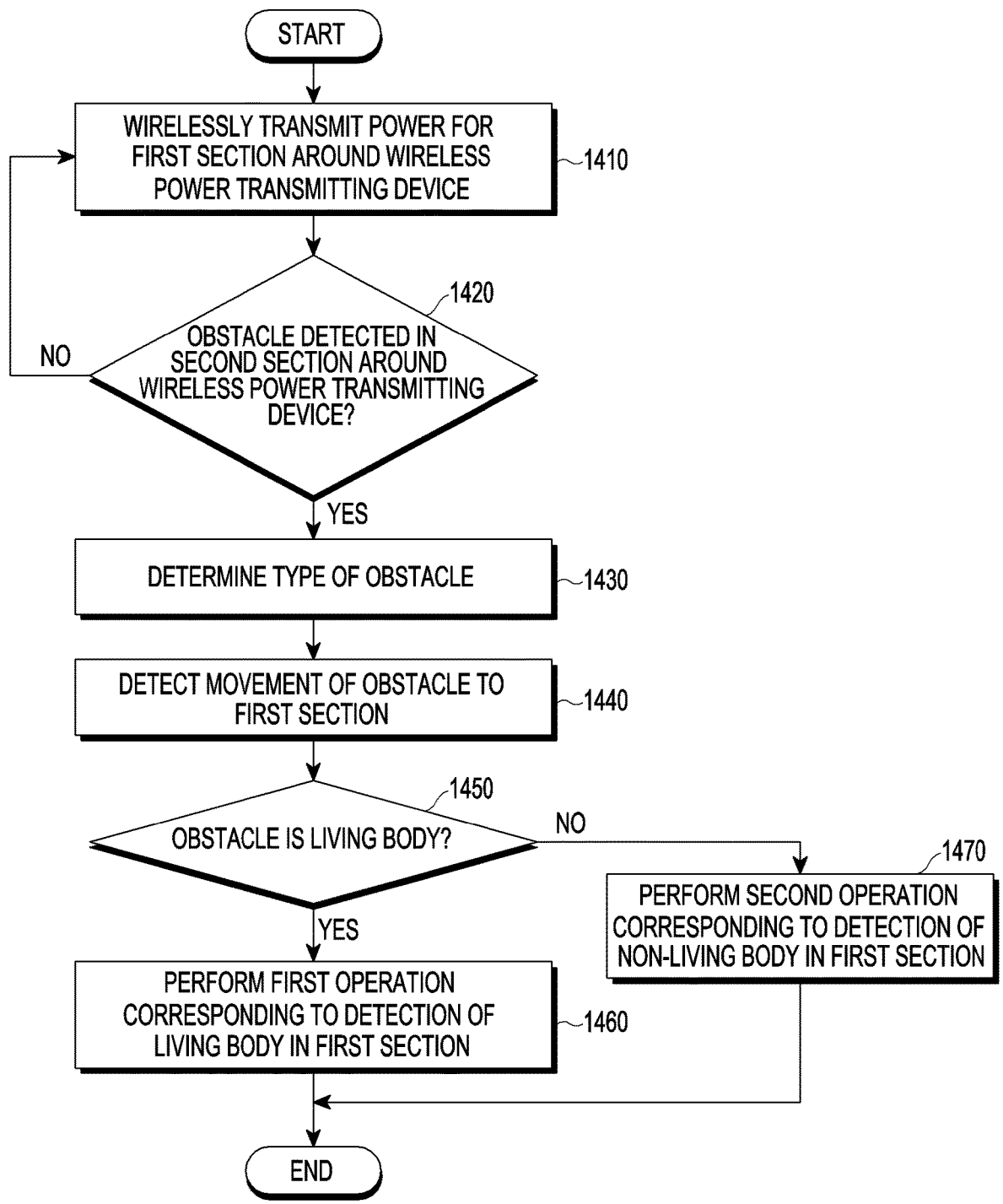
FIG. 14 is a flowchart illustrating a method of operating a wireless power transmitting device according to an embodiment.

FIG. 14 is a flowchart illustrating a method of operating a wireless power transmitting device according to an embodiment.

In operation 1410, the wireless power transmitting device 100 according to an embodiment may wirelessly transmit power for the first section (e.g., the charging section) around the wireless power transmitting device 100. In operation 1420, the wireless power transmitting device 100 may detect an obstacle showing in the second section (e.g., a surrounding section) around the wireless power transmitting device 100. When an obstacle is detected in the second section, in operation 1430, the wireless power transmitting device 100 may determine the type of the obstacle. In operation 1440, the wireless power transmitting device 100 may detect that the obstacle has moved to the first section. In operation 1450, the wireless power transmitting device 100 may determine whether the obstacle is a living body. For example, the wireless power transmitting device 100 may obtain an image of at least one of the first section and the second section, and detect a presence of an obstacle in accordance with an analyzed result. The wireless power transmitting device 100 may determine that the kind of the obstacle is a living body (e.g., a person, an animal, etc.), a moving device, or a moving object by applying various object recognition algorithms to the image. When it is determined that an obstacle is a living body, in operation 1460, the wireless power transmitting device 100 may perform a first operation corresponding to detection of a living body in the first section. For example, the wireless power transmitting device 100 may reduce the intensity of the power that is transmitted under intensity determined by rules etc. When it is determined that an obstacle is not a living body, in operation 1470, the wireless power transmitting device 100 may perform a second operation corresponding to non-detection of a living body in the first section. When an obstacle exists in the charging section, the efficiency of wireless power transmission/reception may be reduced. Accordingly, the wireless power transmitting device 100 may increase the intensity of the power that is transmitted so that the electronic device 150 may receive sufficient intensity of power even if an obstacle is present.

Figure 15:
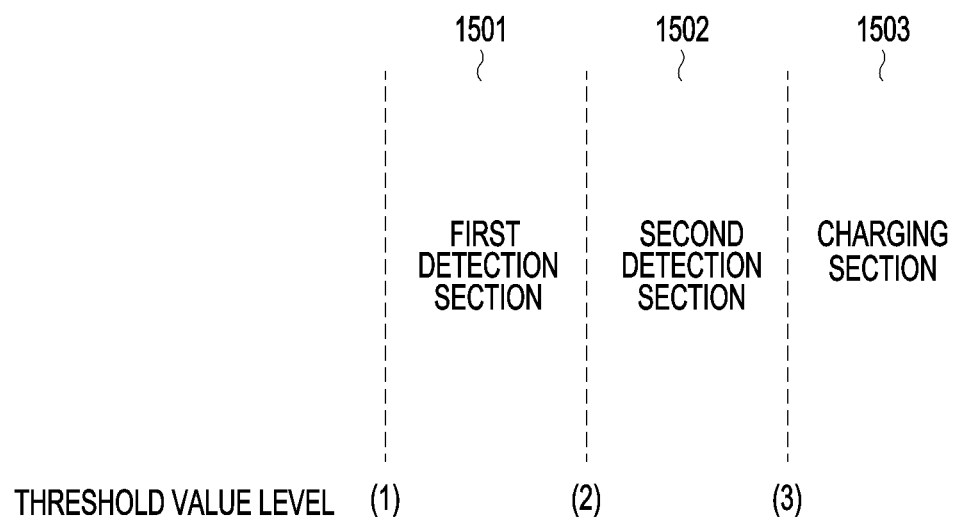
FIG. 15 is a diagram illustrating a surrounding section divided in a plurality of detection sections according to an embodiment.

FIG. 15 is a diagram illustrating a surrounding section divided in a plurality of detection sections according to an embodiment.

Referring to FIG. 15, the wireless power transmitting device 100 may define a plurality of detection sections 1501 and 1502 around a charging section 1503. When an obstacle is detected in any one of the first detection section 1501, the second detection section 1502, and the charging section 1503, the wireless power transmitting device 100 may perform operations respectively set (e.g., defined, predefined, designated, etc.) for the sections. The wireless power transmitting device 100 may set in advance a first threshold value (1) for detecting an obstacle entering the first detection section 1501, a second threshold value (2) for detecting an obstacle entering the second detection section 1502, and a third threshold value (3) for detecting an obstacle entering the charging section 1503. The first threshold value (1) to the third threshold value (3) may have various units, depending on the detection methods. For example, in a method of detecting an obstacle based on the characteristics of a reflected wave, first threshold value (1) to the third threshold value (3) may have units (e.g., dB, rad, and seconds) related to the characteristics of a reflected wave, but the types of units are not limited thereto. For example, when an obstacle is detected in the first detection section 1501, the wireless power transmitting device 100 may output a warning by turning on an LED having a first color and reduce the intensity of the power that is transmitted by about 20%. For example, when an obstacle is detected in the second detection section 1502, the wireless power transmitting device 100 may output a warning by turning on an LED having a second color and reduce the intensity of the power that is transmitted by about 30%. The wireless power transmitting device 100 may further output an additional aural warning. For example, when an obstacle is detected in the charging section 1503, the wireless power transmitting device 100 may output a warning by turning on an LED having a third color and reduce the intensity of the power that is transmitted by about 50%. The wireless power transmitting device 100 may further output an additional aural warning with larger volume. When the obstacle stays in the charging section 1503 over a predetermined threshold value, the wireless power transmitting device 100 may control the electronic device 150 to receive power from a substitute power supply such as a batter in the electronic device 150 and stop wireless transmission of power. When the obstacle moves away from the charging section 1503, the wireless power transmitting device 100 may change the colors of the LEDs in an opposite order or entry or reduce the volume of the aural warning.

Figure 16A:
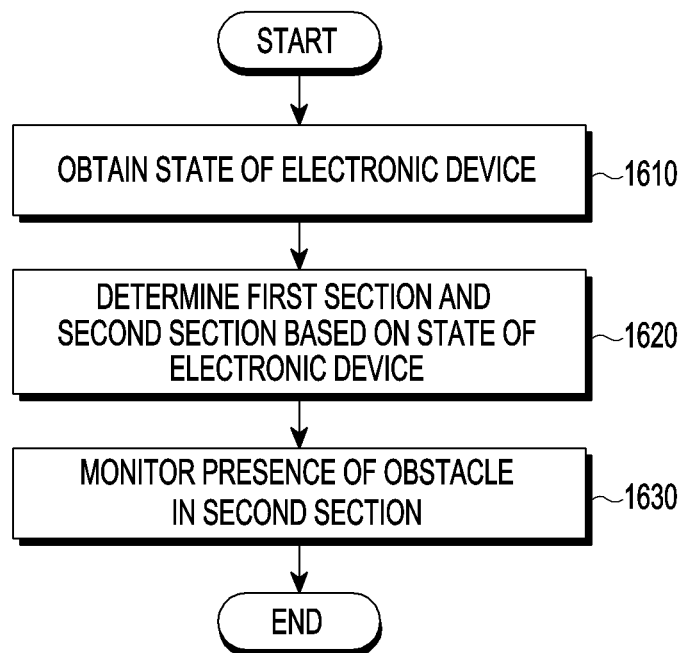
FIG. 16A is a flowchart illustrating a method of operating a wireless power transmitting device according to an embodiment.
Figure 16B:
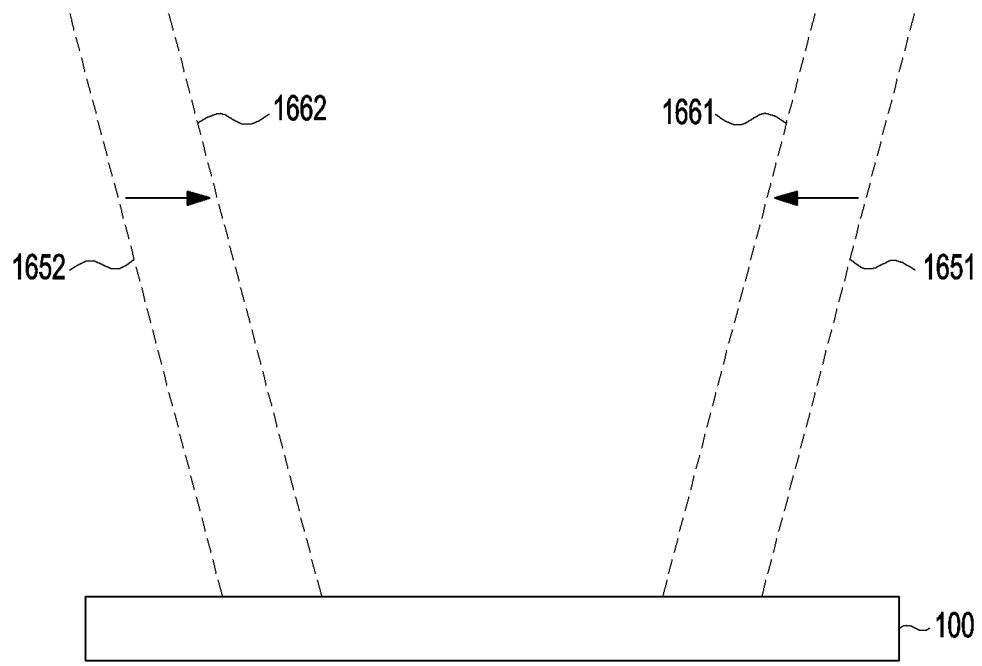
FIG. 16B is a diagram illustrating division of a first section and a second section according to an embodiment.

FIG. 16A is a flowchart illustrating a method of operating a wireless power transmitting device according to an embodiment. The embodiment shown in FIG. 16A is described in more detail with reference to FIG. 16B. FIG. 16B is a diagram illustrating division of a first section and a second section according to various embodiments.

In operation 1610, the wireless power transmitting device 100 according to an embodiment may obtain the state of the electronic device 150. In operation 1620, the wireless power transmitting device 100 may determine a first section and a second section based on the state of the electronic device 150. In operation 1630, the wireless power transmitting device 100 may monitor an object showing in the second section. For example, referring to FIG. 16B, the wireless power transmitting device 100 may set (i.e., define, designate, etc.) the first section and the second section based on first division lines 1651 and 1652 when the state of the electronic device 150 is a first state. When the wireless power transmitting device 100 sets the first section and the second section by analyzing an image, it can set a first-size section based on an electronic device identified in the image as the first section and a second-size section around the first section as the second section. When the wireless power transmitting device 100 sets the first section and the second section based on the characteristics of a reflected wave, it can set the first section and the second section by setting a first threshold value corresponding to the first division lines 1651 and 1652. The wireless power transmitting device 100 may set the first section and the second section based on second division lines 1661 and 1662 and when the state of the electronic device 150 is a second state. When the wireless power transmitting device 100 sets the first section and the second section by analyzing an image, it may set a third-size section based on an electronic device identified in the image as the first section and a fourth-size section around the first section as the second section. When the wireless power transmitting device 100 sets the first section and the second section based on the characteristics of a reflected wave, it may set the first section and the second section by setting a second threshold value corresponding to the second division lines 1661 and 1662. For example, the wireless power transmitting device 100 may set the first section to be relatively wide when a TV is in a display state, and set the first section to be relatively narrow when the TV is in a standby state.

In various embodiments, the wireless power transmitting device 100 may adjust the boundaries of the sections when the state is changed. For example, the wireless power transmitting device 100 may recognize that the device to be charged has been changed (e.g., replaced by another device), and in this case, the wireless power transmitting device 100 may recognize that larger power should be transmitted. In order to secure safety of a user, the wireless power transmitting device 100 may set the first section to be wider, that is, the wireless power transmitting device 100 may adjust the boundary lines for setting the first section and the second section from each other. Further, the wireless power transmitting device 100 may also change the boundary line of the second section. When it is required to transmit relatively larger intensity of power, the wireless power transmitting device 100 may set the second section to be wider, and accordingly, it may adjust the boundary line for setting the second section. Accordingly, when the wireless power transmitting device 100 transmits relatively larger intensity of power, a user may check a warning message in advance from a farther distance.

For example, the wireless power transmitting device 100 may set the first section to be relatively wide when the intensity of the power that is transmitted is relatively large, and set the first section to be relatively narrow when the intensity of the power that is transmitted is relatively small. Further, as described above, the wireless power transmitting device 100 may also set the second section to be relatively wide when the intensity of the power that is transmitted is relatively large, and set the second section to be relatively narrow when the intensity of the power that is transmitted is relatively small. When the intensity of the power that is transmitted is changed, the wireless power transmitting device 100 may adjust the sizes of the first section and the second section in real time, that is, adjust the boundary line for setting the first section and the boundary line for setting the second section. When the device that requires charging is changed (e.g., replaced with another device to be charged), the wireless power transmitting device 100 may adjust the sizes of the first section and the second section in real time, that is, adjust the boundary line for setting the first section and the boundary line for setting the second section. Alternatively, when the status of the device to be charged is changed, that is, when the amount of power to be consumed is changed, the wireless power transmitting device 100 may adjust the sizes of the first section and the second section in real time, that is, adjust the boundary line for setting the first section and the boundary line for setting the second section.

In an embodiment, the wireless power transmitting device 100 may set only the first section without setting the second section, depending on the intensity of the power that is transmitted. For example, when the intensity of the power that is transmitted is a predetermined reference value or more, the wireless power transmitting device 100 may set only the first section. In this case, the wireless power transmitting device 100 may be configured to immediately set the intensity of the power that is transmitted when it is estimated that a living body enters the first section.

In an embodiment, the wireless power transmitting device 100 may set additionally set a third section other than the first section and the second section, depending on the intensity of the power that is transmitted. For example, the wireless power transmitting device 100 may set the section outside the second section as the third section. That is, the third section may be a section where a relatively small magnitude of magnetic field is detected in comparison to the second section when the wireless power transmitting device 100 transmits power. The wireless power transmitting device 100 may additionally set the third section when the intensity of the power that is transmitted is the predetermined reference value or more. In this case, when an object is detected in the third section, the wireless power transmitting device 100 may determine the possibility (e.g., likelihood, mathematical possibility, etc.) that the object enters the second section or an estimated stay time, which will be described in more detail with reference to FIG. 17. When an object is in the third section, the wireless power transmitting device 100 may adjust the intensity of the power that is transmitted, based on the determined result. When the object enters the second section, the wireless power transmitting device 100 may determine the possibility that the object enters the first section or estimated stay time. When an object is in the second section, the wireless power transmitting device 100 may adjust the intensity of the power that is transmitted, based on the determined result. That is, when the intensity of the power that is transmitted is relatively large, the wireless power transmitting device 100 may adjust the intensity of the power that is transmitted step by step in correspondence to the location of the object by setting more sections for adjusting the intensity of the power.

In an embodiment, when detecting that the object is positioned in a specific section, the wireless power transmitting device 100 may adjust the intensity of the power that is transmitted or output a warning message (e.g., visual message or a voice warning). The wireless power transmitting device 100 may change the corresponding operations, depending on the intensity of the power that is transmitted. For example, when the intensity of the power that is transmitted is the predetermined reference value or more and an object is detected in the second section, the wireless power transmitting device 100 may adjust the intensity of the power that is transmitted. For example, when the intensity of the power that is transmitted is less than the predetermined reference value and an object is detected in the second section, the wireless power transmitting device 100 may output a warning message. In another example, the wireless power transmitting device 100 may change the degree of adjusting the power, depending on the intensity of the power that is transmitted. For example, when an object is detected in the second section while the wireless power transmitting device 100 transmits relatively large intensity of power, the wireless power transmitting device 100 may adjust the intensity of the power that is transmitted to be relatively large. For example, when an object is detected in the second section while the wireless power transmitting device 100 transmits relatively small intensity of power, the wireless power transmitting device 100 may adjust the intensity of the power that is transmitted to be relatively small. In another example, the wireless power transmitting device 100 may change the kind or the output magnitude of the warning message, depending on the intensity of the power that is transmitted. For example, when an object is detected in the second section while the wireless power transmitting device 100 transmits relatively large intensity of power, the wireless power transmitting device 100 may output a relatively large voice warning. When an object is detected in the second section while the wireless power transmitting device 100 transmits relatively small intensity of power, the wireless power transmitting device 100 may output a relatively small voice warning.

Figure 17:
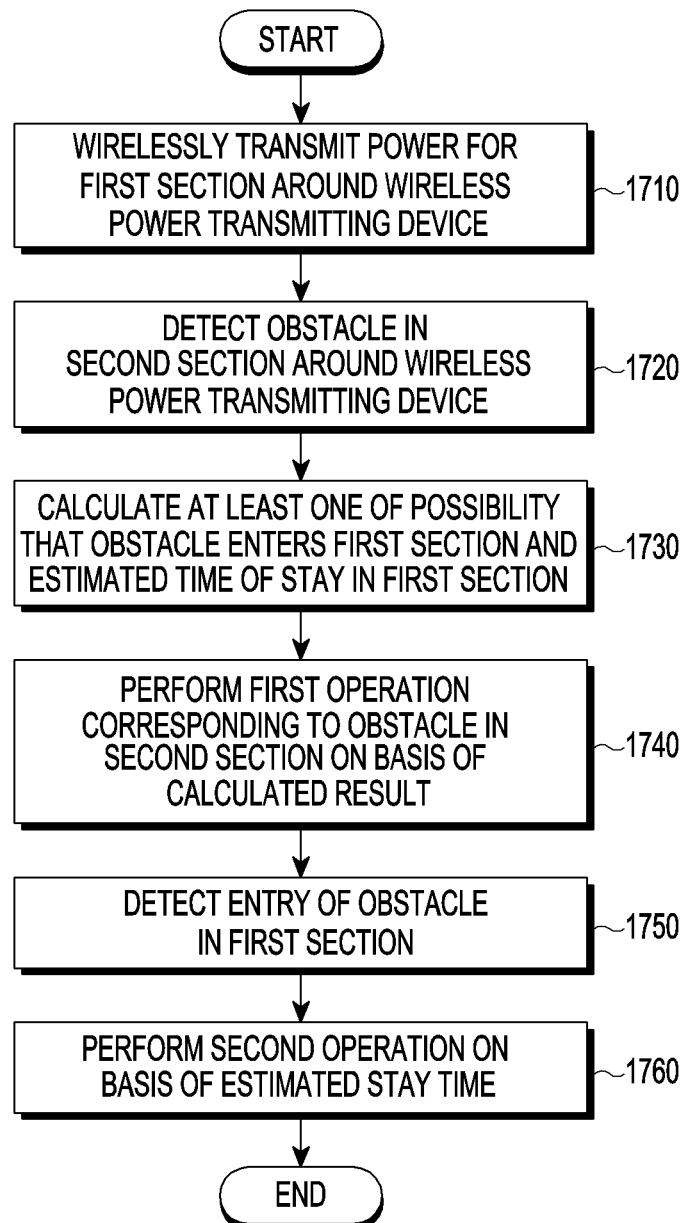
FIG. 17 is a flowchart illustrating a method of operating a wireless power transmitting device according to an embodiment.

FIG. 17 is a flowchart illustrating a method of operating a wireless power transmitting device according to an embodiment.

In operation 1710, the wireless power transmitting device 100 according to an embodiment may wirelessly transmit power for the first section (e.g., the charging section) around the wireless power transmitting device 100. In operation 1720, the wireless power transmitting device 100 may detect an obstacle showing in the second section (e.g., a surrounding section) around the wireless power transmitting device 100. In operation 1730, the wireless power transmitting device 100 may calculate at least one of the possibility that the obstacle enters the first section or estimated time of stay in the first section. For example, the wireless power transmitting device 100 may analyze motions of a human included in an image based on a plurality of image frames, and calculate at least one of the possibility of entering the first section or the estimated time of stay in the first section based on the analyzed motions. The wireless power transmitting device 100 may also identify as user recognized in the image and can calculate at least one of the possibility of entering the first section or the estimated stay time in the first section based on the user's electronic device using pattern. In operation 1740, the wireless power transmitting device 100 can perform a first operation corresponding to detection of an obstacle in the second section based on the calculated result. For example, the possibility of entering the first section is relatively low, the wireless power transmitting device 100 may decrease relatively much the intensity of the power that is transmitted. For example, when the possibility of an obstacle entering the first section is relatively high, the wireless power transmitting device 100 may decrease, by a relatively small degree, the intensity of the power that is transmitted. For example, when the estimated time of stay in the first section is relatively short, the wireless power transmitting device 100 may decrease, by a relatively small degree, the intensity of the power that is transmitted. As another example, when the estimated time of stay in the first section is relatively long, the wireless power transmitting device 100 may decrease, by a relatively large degree, the intensity of the power that is transmitted. In operation 1750, the wireless power transmitting device 100 may determine whether the obstacle has entered the first section. When it is determined that the obstacle has entered the first section, in operation 1760, the wireless power transmitting device 100 may perform a second operation in accordance with the estimated time of stay. For example, when the estimated time of stay in the first section is relatively short, the wireless power transmitting device 100 may decrease, by a relatively small degree, the intensity of the power that is transmitted. In another example, when the estimated stay time in the first section is relatively long, the wireless power transmitting device 100 may decrease, by a relatively high degree, the intensity of the power that is transmitted.

Figure 18:
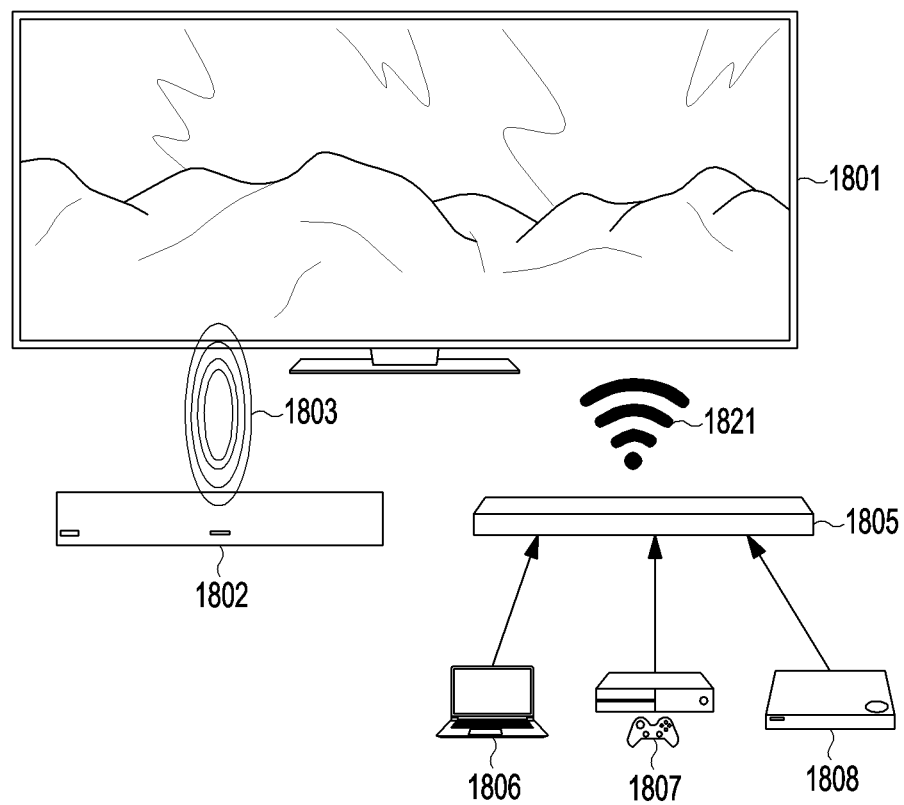
FIG. 18 is a diagram illustrating a TV, a wireless power transmitting device, and a media data transmitting device according to an embodiment.

FIG. 18 is a diagram illustrating a TV, a wireless power transmitting device, and a media data receiving device according to an embodiment.

Referring to FIG. 18, a wireless power transmitting device 1802, for example, may form a magnetic coupling 1803 with a TV 1801, and accordingly, it may wirelessly transmit power. A media data transmitting device 1805 may transmit media data 1821 to the TV 1801. The TV 1801 may process and display the media data 1821 on a display, using power received from the wireless power transmitting device 1802. The media data transmitting device 1805 may receive data from various peripheral devices such as a computer 1806, a video game console 1807, and set-top box 1808, and may create and transmit media data 1821 by processing the data. In an embodiment, the wireless power transmitting device 1802 and the media data transmitting device 1805 may be implemented as different pieces of hardware, as shown in FIG. 18, but the wireless power transmitting device 1802 and the media data transmitting device 1805 may be included in one housing. Although the location where the magnetic coupling 1803 is formed and the location where the media data 1821 is transmitted are different in the figure, this is for the convenience of description, and the location where the magnetic coupling 1803 is formed and the location where the media data 1821 is transmitted may be different or the same. The media data transmitting device 1805 may transmit the media data 1821 of an image quality of 8K, for example, using a communication scheme defined by WiGig. The WiGig communication scheme corresponds to a frequency of 60 GHz, the media data transmitting device 1805 may transmit data at a speed of 6 Gbps, so it is possible to create the media data 1821 by compressing the data at a compression rate of 10:1 in order to transmit the media data 1821 of an image quality of 8K. The wireless power transmitting device 1802 may transmit power of 150 W when the TV 1801 is a 40-inch display and transmit power of 250 W when the TV is a 60-inch display. When an obstacle such as a human is present between the media data transmitting device 1805 and the TV 1801, the media data 1821 may influence the living body and the transmission speed of the media data 1821 may be reduced. For example, when the distance between media data transmitting device 1805 and the TV 1801 is 2-3 m, propagation delay and a reflection loss of 10 dB may be generated. The configuration that the wireless power transmitting device 1802 changes the transmission conditions of power was described above. The media data transmitting device 1805 may change the transmission condition of the media data 1821 when an obstacle is detected in at least one of a first section and a second section. The first section may be a section where the size of the media data 1821 exceeds a first threshold value and the second section may be a section around the first section, for example, where the size of the media data 1821 exceeds a second threshold value and is the first threshold value or less.

Figure 19:
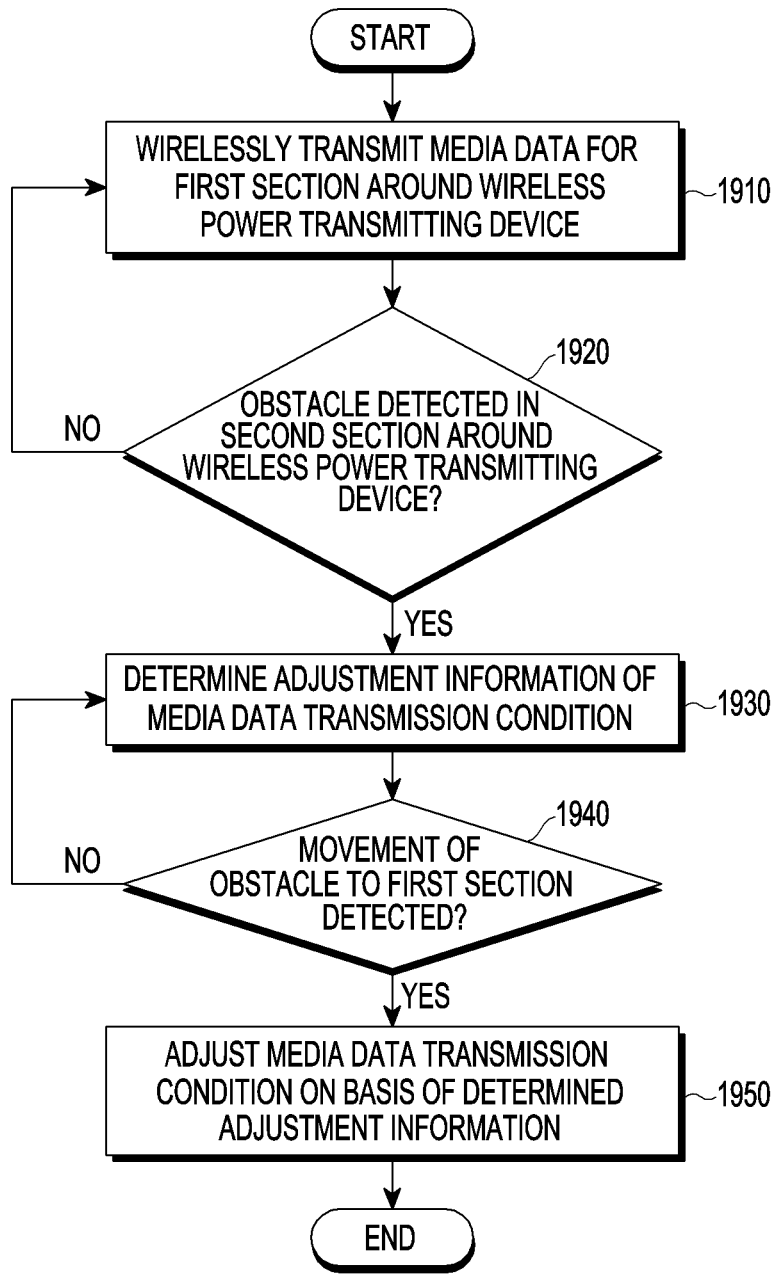
FIG. 19 is a flowchart illustrating a method of operating a wireless power transmitting device according to an embodiment.

FIG. 19 is a flowchart illustrating a method of operating a wireless power transmitting device according to an embodiment. A wireless power transmitting device 100 according to an embodiment, for example, may include a media data transmitting device (e.g., the media data transmitting device 1805), and accordingly, the media data transmitting device may wirelessly transmit power and media data too.

In operation 1910, the wireless power transmitting device 100 according to an embodiment may wirelessly transmit media data for a first section around the wireless power transmitting device 100. In operation 1920, the wireless power transmitting device 100 may detect an obstacle showing in a second section around the wireless power transmitting device, for example, a second section around the first section. As described above, the wireless power transmitting device 100, the electronic device 150, or another electronic device may detect an obstacle showing in the second section or the first section, and the wireless power transmitting device 100 may receive the result of detecting an obstacle by communicating with the electronic device 150 or another electronic device. When an obstacle is detected in the second section, in operation 1930, the wireless power transmitting device 100 may determine adjustment information of media data transmission condition. For example, the adjustment information of a media data transmission condition may include adjustment information of at least one of a beam-forming condition, a transmission frequency, a compression rate, the number of frames, or a play speed. In operation 1940, the wireless power transmitting device 100 may determine that the obstacle moves to the first section. When it is determined that the obstacle has moved to the first section, in operation 1950, the wireless power transmitting device 100 may adjust a media signal transmission condition based on the determined adjustment information.

Figure 20:
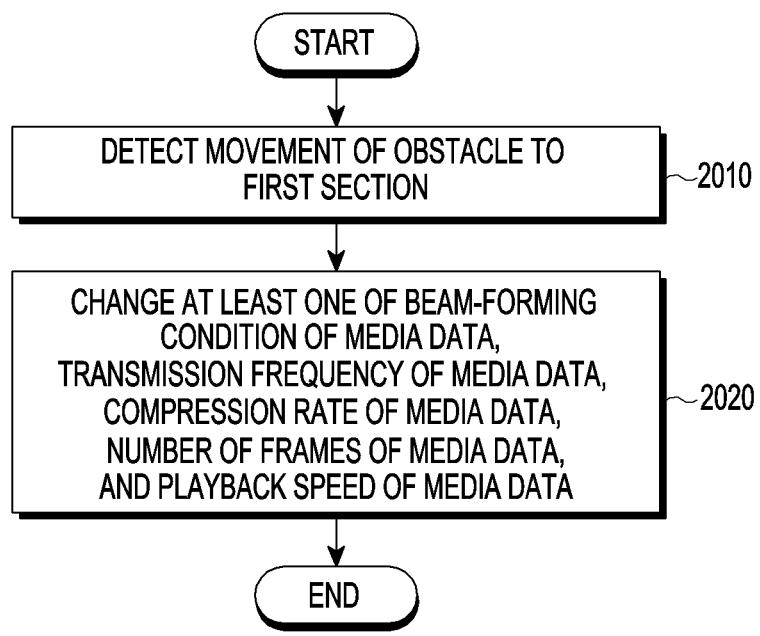
FIG. 20 is a flowchart illustrating a method of operating a wireless power transmitting device according to an embodiment.

FIG. 20 is a flowchart illustrating a method of operating a wireless power transmitting device according to an embodiment.

In operation 2010, the wireless power transmitting device 100 according to an embodiment may detect whether the obstacle has moved to a first section. In operation 2020, the wireless power transmitting device 100 may change at least one of a beam-forming condition of media data, the transmission frequency of the media data, the compression rate of the media data, the number of frames of the media data, and the playback speed of the media data. For example, the wireless power transmitting device 100 may change the beam-forming condition such that media data is transmitted and avoiding the location of the obstacle. When an obstacle is detected in a second section, the wireless power transmitting device 100 may determine appropriate beam-forming transmission condition and beam-forming reception condition, and when an obstacle is detected in the first section, the wireless power transmitting device 100 may transmit media data under the determined beam-forming condition. The wireless power transmitting device 100 may transmit the determined beam-forming condition to the electronic device 150 and the electronic device 150 can receive media data based on the received beam-forming condition. For example, the wireless power transmitting device 100 may use another communication scheme (e.g., Wi-Fi communication scheme or Bluetooth communication scheme) by decreasing the frequency of the media data or increase the compression rate of the media data. Accordingly, the image quality of the media data may be slightly deteriorated, but the media data may be stably supplied. For example, the wireless power transmitting device 100 may transmit only some of the frame of the media data. When the media data of the wireless power transmitting device 100 is compressed, for example, in an inter-prediction scheme, the wireless power transmitting device 100 may transmit only some frames such as I-frames to the electronic device 150. The electronic device 150 may reproduce a moving image (i.e., movie), using the received partial frames and reproduce a moving image by inserting the received partial frames for the time corresponding to the non-received frames (e.g., missing frames). For example, the wireless power transmitting device 100 may adjust the playback speed of the media data. The wireless power transmitting device 100 may transmit the media data at a relatively low speed, and in this case, a moving image may be played relatively slowly in the electronic device 150.

In an embodiment, the wireless power transmitting device 100 may transmit media data through a detour path. For example, the wireless power transmitting device 100 may transmit media data to another electronic device (e.g., a relay device) that can transmit media data to the electronic device 150, and in this case, another electronic device may transmit the media data to the electronic device 150.

Figure 21:
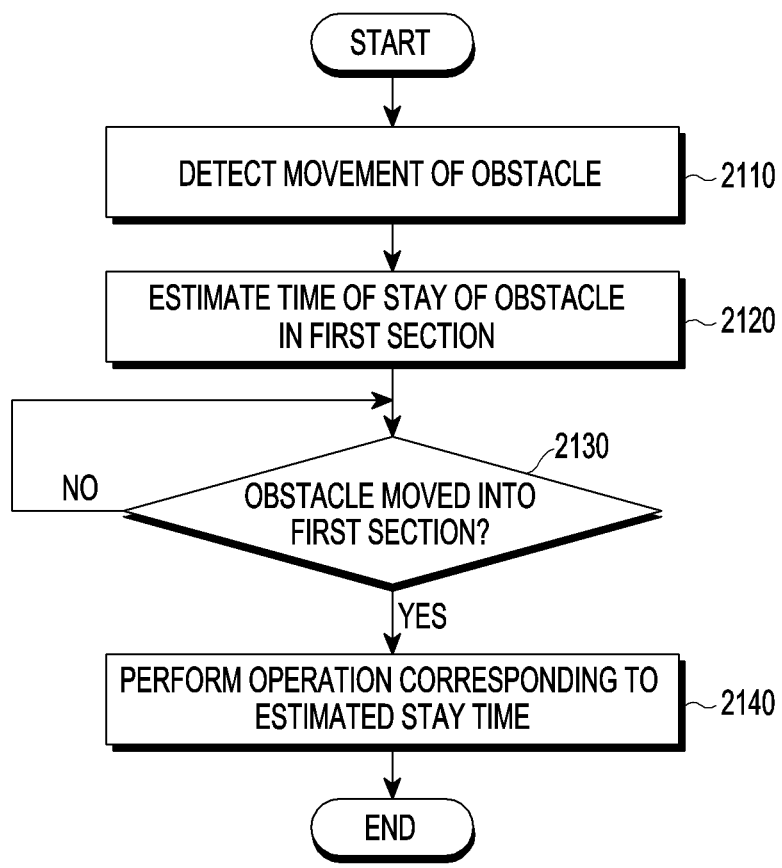
FIG. 21 is a flowchart illustrating a method of operating a wireless power transmitting device according to an embodiment.

FIG. 21 is a flowchart illustrating a method of operating a wireless power transmitting device according to an embodiment.

In operation 2110, the wireless power transmitting device 100 according to an embodiment may detect movement of an obstacle. For example, the wireless power transmitting device 100 may detect an obstacle moving in a surrounding section of a first section. The wireless power transmitting device 100 may estimate the stay time of an obstacle in the first section in operation 2120. For example, the wireless power transmitting device 100 may detect movement of an obstacle in a plurality of image frames of the obstacle and calculate the speed of the obstacle, using the degree of movement of the obstacle according to time. The wireless power transmitting device 100 may estimate the time of stay, for example, based on the calculated speed. Alternatively, the wireless power transmitting device 100 may determine the speed of the obstacle through various methods, not the method of using an image, and may estimate the time of stay based on the found speed in methods other than the method of using an image. Alternatively, the wireless power transmitting device 100 may identify the obstacle, using an image of the obstacle. The wireless power transmitting device 100 may estimate the stay time of the obstacle based on the identified information. For example, the wireless power transmitting device 100 may store in advance related information between the identified information and the time of stay in the first section, as shown in Table 3.

TABLE 3

| Identified information | Estimate stay time |
|---|---|
| Tom | 3 sec |
| Robot vacuum cleaner | 10 sec |
| Jane | 20 sec |

As in Table 3, the wireless power transmitting device 100 may obtain the related information by checking the existing stay times of obstacles in the first section and collecting statistics of the stay times, and update the related information.

In operation 2130, the wireless power transmitting device 100 may detect that the obstacle moves into the first section. When it is detected that the obstacle has moved into the first section, in operation 2140, the wireless power transmitting device 100 may perform an operation corresponding to the estimated stay time. For example, when the estimated stay time is in a first range, the wireless power transmitting device 100 may adjust beam-forming of media data. For example, when the estimated stay time is in a second range, the wireless power transmitting device 100 may change the transmission frequency of media data. For example, when the estimated time of stay is in a third range, the wireless power transmitting device 100 may transmit only some of the frames of media data. For example, when the estimated time of stay is in a fourth range, the wireless power transmitting device 100 may stop power transmission while controlling the electronic device 150 to receive power from another power supply. For example, when the estimated time of stay is in a fifth range, the wireless power transmitting device 100 may output a warning message. When the estimated time of stay is in any one range, the wireless power transmitting device 100 may simultaneously perform two or more of the various operations described above.

The wireless power transmitting device 100 according to an embodiment may measure the actual stay time of an obstacle in the first section and may perform an operation corresponding to the measured time.

Figure 22:
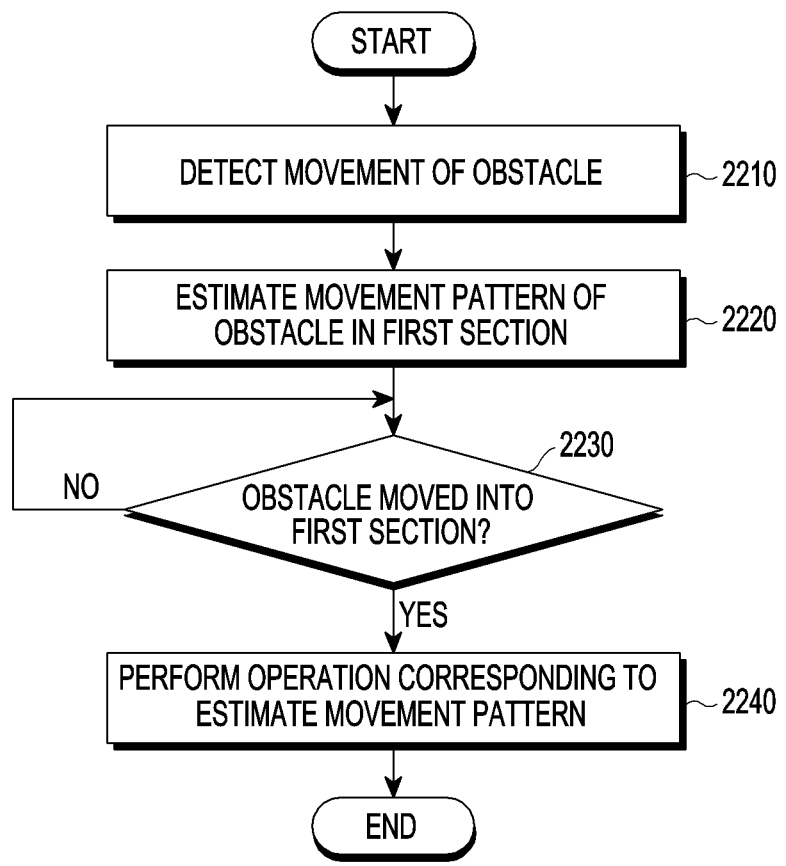
FIG. 22 is a flowchart illustrating a method of operating a wireless power transmitting device according to an embodiment.

FIG. 22 is a flowchart illustrating a method of operating a wireless power transmitting device according to an embodiment.

In operation 2210, the wireless power transmitting device 100 according to an embodiment may detect movement of an obstacle. For example, the wireless power transmitting device 100 may detect an obstacle moving in a surrounding section of a first section. The wireless power transmitting device 100 may estimate a movement pattern of an obstacle in the first section in operation 2220. For example, the wireless power transmitting device 100 may analyze a plurality of image frames of an obstacle and estimate the movement pattern of the obstacle on the analyzed result. The wireless power transmitting device 100 may determine the movement direction of an obstacle around the first section and estimate the movement direction of the obstacle in the first section. The wireless power transmitting device 100 may identify the obstacle from an image of the obstacle and estimate the movement pattern based on the identified result. The wireless power transmitting device 100 may estimate the movement pattern of an object, using various movement or behavior estimation algorithms. The wireless power transmitting device 100 may store in advance related information between identified result and a movement pattern and estimate a movement pattern based on the related information. In operation 2230, the wireless power transmitting device 100 may determine that the obstacle moves to the first section. When it is determined that the obstacle has moved to the first section, in operation 2240, the wireless power transmitting device 100 may perform an operation corresponding to an estimated movement pattern.

The wireless power transmitting device 100 according to an embodiment may measure the actual time of stay of an obstacle in the first section and may perform an operation corresponding to the measured time.

Each of elements of the wireless power transmission device or electronic device according to the present disclosure may be implemented by one or more components and the name of the corresponding element may vary depending on the type of the electronic device. In an embodiment, the inspection apparatus may include at least one of the above-described elements. Some of the above-described elements may be omitted from the electronic device, or the inspection apparatus may further include additional elements. Further, some of the components of the electronic device according to the various embodiments may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGAs), and a programmable-logic device for performing operations which has been known or are to be developed hereinafter.

According to an embodiment, at least some of the devices (e.g., modules or functions thereof) or the method (e.g., operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory.

According to an embodiment, a storage media may store instructions, in which the commands are set to make at least one processor perform at least one operation when the commands are executed by the processor. The operations may include: an operation of wirelessly transmitting power for a first section around the wireless power transmitting device; an operation of performing a predetermined first operation when an obstacle is detected in a second section around the first section; and an operation of performing a predetermined second operation when it is detected that the obstacle enters the first section.

The commands may be stored in an external server or may be downloaded and installed in an electronic device such as a wireless power transmitting device. That is, an external server according to various embodiments can store commands that a wireless power transmitting device can download.

The computer-readable recoding medium may include a hard disk, a floppy disk, magnetic media (e.g., a magnetic tape), optical media (e.g., a compact disc read-only memory (CD-ROM) and a digital versatile disc (DVD)), magneto-optical media (e.g., a floptical disk), a hardware device (e.g., a read-only memory (ROM), a random access memory (RAM), a flash memory, etc.), and the like. In addition, the program instructions may include high-level language codes, which can be executed in a computer by using an interpreter, as well as machine codes generated by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Furthermore, some operations may be executed in a different order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. A wireless power transmitting device comprising:
   a power transmission circuit; and
   a processor,
   wherein the processor is configured to:
     control the power transmission circuit to wirelessly transmit first power with a first level for a first location of a first area around the wireless power transmitting device and to wirelessly transmit second power with a second level for a second location of a second area adjacent to the first area,
     wherein the first level is greater than the second level,
     based on detecting an obstacle in the second area while wirelessly transmitting the first power with the first level to an electronic device in the first area, decrease a level of the first power from the first level to a third level, and
     based on detecting that the obstacle enters the first area from the second area while wirelessly transmitting the first power with the third level to the electronic device in the first area, decrease a level of the first power from the third level to a fourth level.

2. The wireless power transmitting device of claim 1, further comprising a communication circuit,
   wherein the processor is further configured to:
     control the communication circuit to transmit a communication signal during a first time period,
     receive a reflected wave created by reflection of the communication signal, through the communication circuit during a second time period, and
     detect the obstacle in at least one of the first area or the second area based on the received reflected wave.

3. The wireless power transmitting device of claim 2, wherein the processor is further configured to detect the obstacle based on at least one of an amplitude, a phase, or a time of flight of the received reflected wave.

4. The wireless power transmitting device of claim 3, wherein the processor is further configured to compare at least one of the amplitude, the phase, or the time of flight of the received reflective wave with a predetermined threshold value and to determine whether the obstacle is detected in the first area or the second area based on a result of the comparing.

5. The wireless power transmitting device of claim 4, further comprising a communication circuit, and
   wherein the processor is further configured to:
     control the communication circuit to transmit a message for instructing to reduce required power of the electronic device before decreasing the level of the first power.

6. The wireless power transmitting device of claim 1, wherein the processor is further configured to obtain an image of at least one of the first area or the second area and to detect the obstacle based on the obtained image.

7. The wireless power transmitting device of claim 6, wherein the processor is further configured to:
     determine at least one of a possibility that the obstacle enters the first area, estimated time of stay of the obstacle in the first area, or a movement pattern of the obstacle in the first area, based on the obtained image; and
     perform a predetermined operation in accordance with a result of the determining.

8. The wireless power transmitting device of claim 1, wherein the processor is further configured to:
     based on detecting the obstacle in the second area, determine a transmission path of the first power that is transmitted through the power transmission circuit based on a location of the obstacle, and based on detecting the obstacle in the first area, control the power transmission circuit to transmit the first power on the determined transmission path.

9. The wireless power transmitting device of claim 8, wherein the power transmission circuit includes a plurality of coils, and
wherein the processor is configured to:
based on detecting the obstacle in the second area, activate a first portion of the plurality of coils and deactivate a second portion of the plurality of coils based on the location of the obstacle; and
based on detecting the obstacle in the first area, control the power transmission circuit to transmit the first power on the transmission path by applying a current to the first portion of the plurality of coils without applying the current to the second portion of the plurality of coils.

10. The wireless power transmitting device of claim 8, wherein the power transmission circuit includes a plurality of patch antennas, and
wherein the processor is further configured to:
based on the obstacle not being detected, control at least one of a phase or an amplitude of electrical signals that are input to the patch antennas to wirelessly transmit the first power on the first transmission path based on a location of an electronic device;
based on detecting the obstacle in the second area, determine at least one of the phase or the amplitude of the electrical signals that are input to the patch antennas to wirelessly transmit the first power on a second transmission path different from the first transmission path based on the location of the obstacle and the location of the electronic device; and
based on detecting the obstacle in the second area, control at least one of the phase or the amplitude of the electrical signals that are input to the patch antennas based on a result of the determining to wirelessly transmit the first power on the second transmission path.

11. The wireless power transmitting device of claim 1, wherein the processor is further configured to:
based on detecting the obstacle in a third area positioned opposite of the first area from the second area, perform a predetermined operation.

12. The wireless power transmitting device of claim 1, wherein the processor is further configured to:
obtain state information of an electronic device wirelessly receiving and using the first power; and
designate the first area and the second area based on the obtained state information.

13. The wireless power transmitting device of claim 1, further comprising a media data transmitting device,
wherein the processor is further configured to:
control the media data transmitting device to transmit media data for a fourth area around the wireless power transmitting device;
based on detecting the obstacle in a fifth area around the fourth area, perform a predetermined first operation; and
based on detecting the obstacle in the fourth area, perform a predetermined second operation.

14. The wireless power transmitting device of claim 13, wherein the processor is further configured to:
based on detecting the obstacle in any one of the fourth area and the fifth area, adjust at least one of a beam-forming condition of the media data, a transmission frequency of the media data, a compression rate of the media data, a number of frames of the media data, or a playback speed of the media data.

15. The wireless power transmitting device of claim 14, wherein the processor is further configured to:
based on detecting the obstacle in the fifth area, determine estimated time of stay of the obstacle in the fourth area; and
adjust at least one of the beam-forming condition of the media data, the transmission frequency of the media data, the compression rate of the media data, the number of frames of the media data, or the playback speed of the media data further based on the estimated time of stay.

16. The wireless power transmitting device of claim 14, wherein the processor is further configured to:
based on detecting the obstacle in the fifth area, determine a movement pattern of the obstacle in the fourth area; and
adjust at least one of the beam-forming condition of the media data, the transmission frequency of the media data, the compression rate of the media data, the number of frames of the media data, or the playback speed of the media data based on the movement pattern.

17. A method of operating a wireless power transmitting device, the method comprising:
wirelessly transmitting first power with a first level for a first location of a first area around the wireless power transmitting device and to wirelessly transmit second power with a second level for a second location of a second area adjacent to the first area, wherein the first level is greater than the second level;
based on detecting an obstacle in the second area while wirelessly transmitting the first power with the first level to an electronic device in the first area decreasing a level of the first power from the first level to a third level; and
based on detecting that the obstacle enters the first area from the second area while wirelessly transmitting the first power with the third level to the electronic device in the first area, decrease a level of the first power from the third level to a fourth level.

18. The method of claim 17, further comprising:
transmitting a communication signal during a first time period;
receiving a reflected wave created by reflection of the communication signal during a second time period; and
detecting the obstacle in at least one of the first area or the second area based on the received reflected wave.

19. The method of claim 18, wherein the obstacle is detected based on at least one of an amplitude, a phase, or a time of flight of the received reflected wave.

20. The method of claim 19, wherein the detecting of the obstacle comprises comparing at least one of the amplitude, the phase, or the time of flight of the received reflected wave with a predetermined threshold value, and determining whether the obstacle is detected in the first area or the second area based on a result of the comparing.

21. The method of claim 20, further comprising transmitting a message giving an instruction to reduce required power of an electronic device before decreasing the level of the first power.

22. The method of claim 17, further comprising:
obtaining an image of at least one of the first area or the second area; and
detecting the obstacle based on the obtained image.

23. The method of claim 22, further comprising determining at least one of a possibility that the obstacle enters the first area, estimated time of stay of the obstacle in the first area, or a movement pattern of the obstacle in the first area, based on the obtained image,
   wherein a predetermined operation is performed in accordance with a result of the determining.

24. The method of claim 17, further comprising:
   determining a transmission path of the first power that is transmitted, based on a location of the obstacle; and
   transmitting the first power on the determined transmission path.

25. The method of claim 24,
   wherein the determining of the transmission path comprises activating a first portion of a plurality of coils included in the wireless power transmitting device and deactivating a second portion of the plurality of coils based on the location of the obstacle, and
   wherein the transmitting of the first power comprises transmitting the first power on the determined transmission path by applying a current to the first portion of the plurality of coils without applying the current to the second portion of the plurality of coils in response to the obstacle being detected in the first area.

26. The method of claim 24, wherein the wirelessly transmitting of the first power comprises based on the obstacle not being detected, controlling at least one of a phase or an amplitude of electrical signals that are input to a plurality of patch antennas included in the wireless power transmitting device to wirelessly transmit the first power on a first transmission path based on a location of an electronic device,
   wherein the determining of the transmission path comprises based on detecting the obstacle in the second area, determining at least one of the phase or the amplitude of the electrical signals that are input to the patch antennas to wirelessly transmit the first power on a second transmission path different from the first transmission path based on the location of the obstacle and the location of the electronic device, and
   wherein the transmitting of the first power on the determined transmission path comprises based on detecting the obstacle in the second area, controlling at least one of the phase or the amplitude of the electrical signals that are input to the patch antennas based on a result of the determining to wirelessly transmit the first power on the second transmission path.

\* \* \* \* \*